United States Patent
Kang et al.

(10) Patent No.: US 12,127,296 B2
(45) Date of Patent: Oct. 22, 2024

(54) METHOD AND APPARATUS FOR RELAY DISCOVERY ON SIDELINK IN WIRELESS COMMUNICATION SYSTEM

(71) Applicant: Samsung Electronics Co., Ltd., Suwon-si (KR)

(72) Inventors: Hyunjeong Kang, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 17/449,433

(22) Filed: Sep. 29, 2021

(65) Prior Publication Data
US 2022/0103997 A1 Mar. 31, 2022

(30) Foreign Application Priority Data
Sep. 29, 2020 (KR) .................. 10-2020-0127436

(51) Int. Cl.
*H04W 8/00* (2009.01)
*H04W 76/27* (2018.01)
*H04W 88/04* (2009.01)

(52) U.S. Cl.
CPC ........... *H04W 8/005* (2013.01); *H04W 76/27* (2018.02); *H04W 88/04* (2013.01)

(58) Field of Classification Search
CPC ..... H04W 8/005; H04W 76/27; H04W 88/04; H04W 76/14; H04W 24/10; H04W 40/22; H04W 92/18
See application file for complete search history.

(56) References Cited

U.S. PATENT DOCUMENTS

| | | |
|---|---|---|
| 10,154,402 B2 | 12/2018 | Agiwal et al. |
| 10,439,682 B2 | 10/2019 | Tseng et al. |
| 2020/0100088 A1 | 3/2020 | Kim et al. |
| 2021/0168814 A1 | 6/2021 | Chen et al. |
| 2021/0315057 A1* | 10/2021 | Baek ............ H04W 76/10 |

(Continued)

FOREIGN PATENT DOCUMENTS

| | | |
|---|---|---|
| CN | 110830952 A | 2/2020 |
| EP | 3618391 A1 | 3/2020 |
| WO | 2020168080 A1 | 8/2020 |

OTHER PUBLICATIONS

3GPP TSG-RAN WG2 Meeting #111; R2-2006612; Source: CATT ; Title: Discovery Model/Procedure for NR Sidelink Relay, Electronic, Aug. 17-28, 2020 (Year: 2020).*

(Continued)

*Primary Examiner* — Mohammed S Chowdhury

(57) ABSTRACT

The disclosure relates to a communication technique for convergence between an IoT technology and a 5th generation (5G) or pre-5G communication system for supporting a higher data transmission rate than a 4G system such as long term evolution (LTE), and a system thereof. The disclosure may be applied to intelligence services (for example, smart homes, smart buildings, smart cities, smart cars or connected cars, healthcare, digital education, retail businesses, security and safety related services, etc.) based on a 5G communication technology and an IoT-related technology. According to various embodiments of the disclosure, a method and an apparatus for supporting a sidelink relay discovery in a wireless communication system may be provided.

16 Claims, 27 Drawing Sheets

(56) References Cited

U.S. PATENT DOCUMENTS

| | | | |
|---|---|---|---|
| 2023/0056864 A1* | 2/2023 | Luo | H04W 72/569 |
| 2023/0107139 A1* | 4/2023 | Lu | H04W 8/005 370/329 |
| 2023/0180313 A1* | 6/2023 | Freda | H04W 76/27 370/310 |
| 2023/0180317 A1* | 6/2023 | Harounabadi | H04W 72/20 370/329 |

OTHER PUBLICATIONS

3GPP TSG-RAN WG2 Meeting #111 electronic; R2-2006738; Source: ZTE Corporation, Sanechips; Title: Discussion on relay discovery and link management, Online, Aug. 17-28, 2020 (Year: 2020).*

3GPP TSG-RAN WG2 Meeting #111e; R2-2007098; Source: Apple, Convida Wireless; Title: Discussion on NR Sidelink Relay Discovery ; Online, Aug. 17-28, 2020 (Year: 2020).*

International Search Report and Written Opinion of the International Searching Authority dated Dec. 21, 2021, in connection with International Application No. PCT/KR2021/013378, 8 pages.

3GPP TR 23.752 V0.4.0 (Jun. 2020), Technical Report, 3rd Generation Partnership Project; Technical Specification Group Services and System Aspects; Study on system enhancement for Proximity based Services (ProSe) in the 5G System (5GS) (Release 17), Jun. 2020, 115 pages.

Oppo (Rapporteur), "Discovery model and procedure," R2-2008255, 3GPP TSG-RAN WG2 #111-e, E-meeting, Aug. 2020, 36 pages.

ZTE Corporation et al., "Discussion on relay discovery and link management," R2-2006738, 3GPP TSG-RAN WG2 Meeting #111 electronic online, Aug. 17-28, 2020, 4 pages.

Supplementary European Search Report dated Dec. 14, 2023, in connection with European Patent Application No. 21876045.2, 14 pages.

Oppo, "Discussion on SL relay discovery procedure", R2-2006771, 3GPP TSG-RAN WG2 #111-e, Aug. 2020, 5 pages.

* cited by examiner

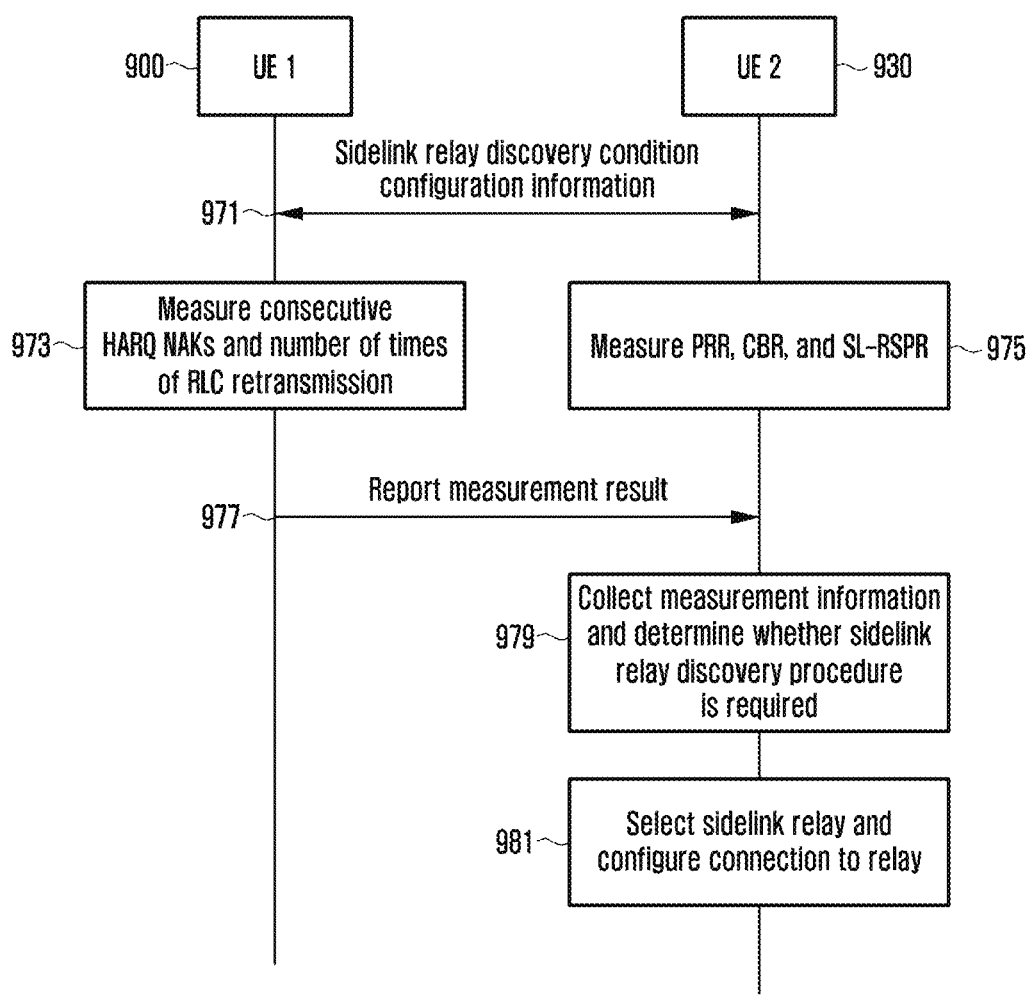

FIG. 17

METHOD AND APPARATUS FOR RELAY DISCOVERY ON SIDELINK IN WIRELESS COMMUNICATION SYSTEM

CROSS-REFERENCE TO RELATED APPLICATION

This application is based on and claims priority under 35 U.S.C. § 119 to Korean Patent Application No. 10-2020-0127436, filed on Sep. 29, 2020, in the Korean Intellectual Property Office, the disclosure of which is herein incorporated by reference in its entirety.

BACKGROUND

1. Field

The disclosure relates to a wireless communication system. More specifically, the disclosure relates to a method and an apparatus for discovering a relay terminal which can support direct communication in a case of performing terminal-to-terminal direct communication according to a sidelink in a wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The 5G system is considering supports for more various services as compared to the conventional 4G system. For example, the most representative service may include a ultrawide band mobile communication service (enhanced mobile broad band (eMBB)), an ultrahigh reliable/low latency communication service (ultra-reliable and low latency communication (URLLC)), a massive device-to-device communication service (massive machine type communication (mMTC)), and a next-generation broadcast service (evolved multimedia broadcast/multicast service (eMBMS)). A system providing the URLLC service may be referred to as a URLLC system, and a system providing the eMBB service may be referred to as an eMBB system. The terms "service" and "system" may be interchangeably used.

Among these services, the URLLC service that is a new service under consideration in the 5G system in contrast to the existing 4G system requires to meet ultrahigh reliability (e.g., packet error rate of about 10-5) and low latency (e.g., about 0.5 msec) conditions as compared to the other services. To meet these strict conditions required therefor, the URLLC service may need to apply a shorter transmission time interval (TTI) than the eMBB service, and various operating scheme employing the same are now under consideration.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

In addition, research into terminal-to-terminal direct communication (sidelink communication) using a 5G communication system has been conducted, and it is expected that the sidelink communication is applicable to, for example, vehicle-to-everything (hereinafter, referred to as "V2X") communication and a public safety network, and can thus provide various services to a user.

Specifically, a scheme of utilizing a sidelink relay which can support service coverage expansion, an increase in data transmission reliability, and reduction in terminal power consumption is required.

The above information is presented as background information only to assist with an understanding of the disclosure. No determination has been made, and no assertion is made, as to whether any of the above might be applicable as prior art with regard to the disclosure.

SUMMARY

The disclosure may provide a method and an apparatus for processing a sidelink relay discovery procedure to support a terminal which performs sidelink-based data transmission or reception in a wireless communication system.

The technical subjects pursued in the disclosure may not be limited to the above-mentioned technical subjects, and other technical subjects which are not mentioned may be clearly understood, through the following descriptions, by those skilled in the art to which the disclosure pertains.

According to an embodiment, a method performed by a user equipment (UE) comprises obtaining specified configuration information for a discovery message, receiving, from a relay UE, the discovery message through a sidelink-signaling radio bearer (SL-SRB) for the discovery message based on the specified configuration information, wherein the SL-SRB for the discovery message is different from one or more SL-SRBs for a PC5 signaling and a PC5-RRC (radio resource control).

According to an embodiment, a method performed by a relay UE comprises obtaining specified configuration information for a discovery message, transmitting, to a UE, the discovery message through a SL-SRB for the discovery message based on the specified configuration information, wherein the SL-SRB for the discovery message is different from one or more SL-SRBs for a PC5 signaling and a PC5-RRC.

According to an embodiment, a UE comprises at least one transceiver and at least one processor, wherein the at least one processor is configured to obtain specified configuration information for a discovery message, receive from a relay UE, the discovery message through a SL-SRB for the discovery message based on the specified configuration information, wherein the SL-SRB for the discovery message is different from one or more SL-SRBs for a PC5 signaling and a PC5-RRC.

An embodiment of the disclosure can effectively provide a service in a wireless communication system, and provide an apparatus and a method which can expand service coverage.

Effects obtainable from the disclosure may not be limited to the above-mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts:

FIG. 9C illustrates an operation of a terminal performing a sidelink relay discovery procedure in sidelink unicast according to an embodiment of the disclosure;

FIG. 17 illustrates a SL SCH MAC subheader according to an embodiment of the disclosure.

DETAILED DESCRIPTION

Figure 1A:
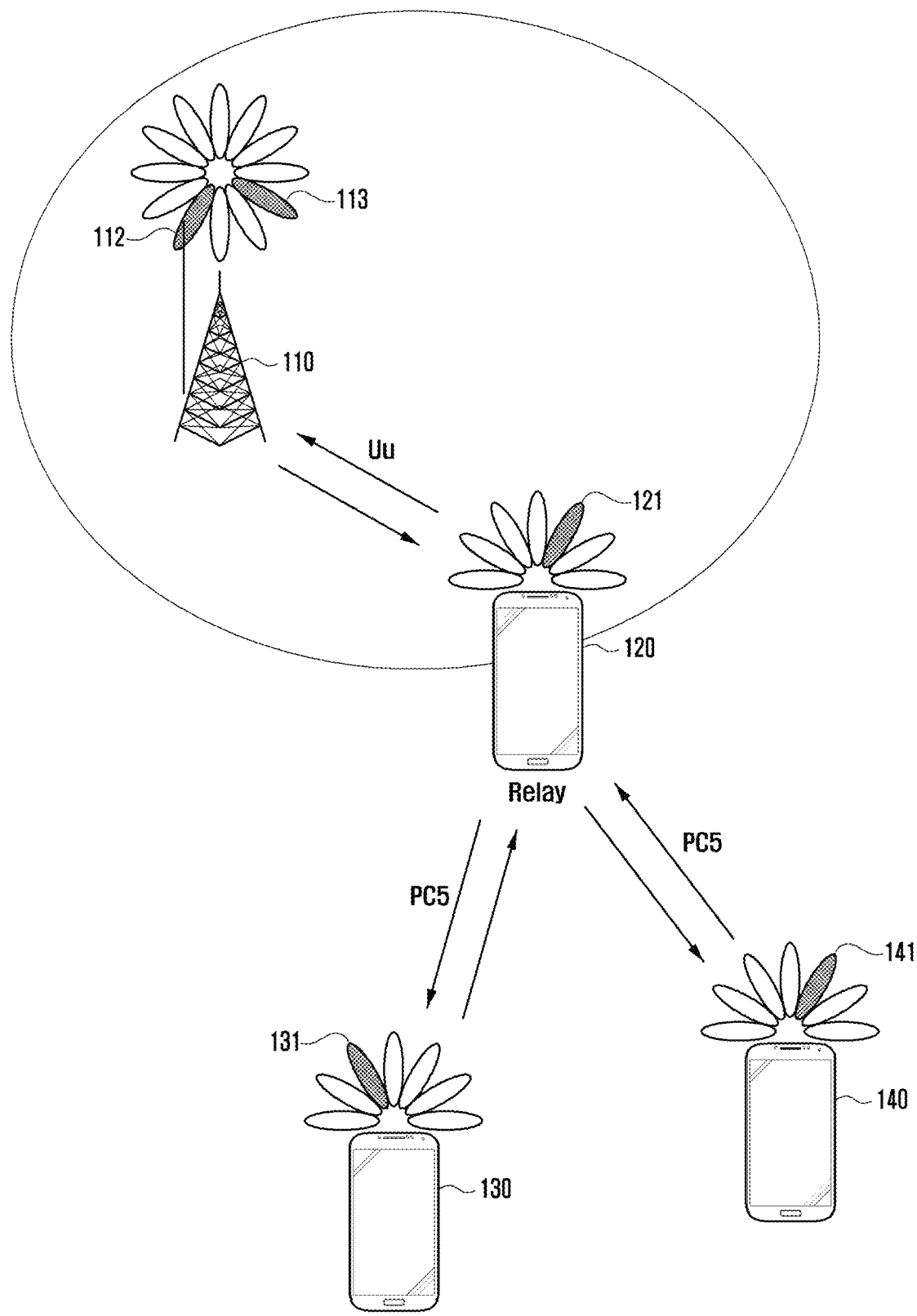
FIG. 1A illustrates a wireless communication system according to an embodiment of the disclosure.

FIGS. 1A through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings. It should be noted that, in the drawings, the same or like elements are designated by the same or like reference signs as much as possible. Further, a detailed description of known functions or configurations that may make the subject matter of the disclosure unclear will be omitted.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

The detailed description of the embodiments of the disclosure is mainly for a new radio access network (RAN) (NR) and a packet core (a 5th generation (5G) system, a 5G core network, or next generation core (NG Core)) that is a core network, on the 5G mobile communication standard specified by 3rd generation partnership project (3GPP), which is a mobile communication standardization organization. However, the main subject matter of the disclosure is applicable with a slight modification without greatly departing from the scope of the disclosure to other communication systems having a similar technical background, which will be determined by those skilled in the art.

In the 5G system, in order to support network automation, a network data collection and analysis function (NWDAF), which is a network function that provides a function of analyzing and providing data collected in a 5G network, may be defined. The NWDAF may collect/store/analyze information from the 5G network and provide the results thereof to unspecified network functions (NFs), and the result of analysis may be used independently in each NF.

Hereinafter, for convenience of description, some terms and names defined in the 3GPP standard (standards of 5G, NR, long term evolution (LTE), or a system similar thereto) may be used. However, these are not limited by the terms and names of the disclosure, and may be equally applied to systems conforming to other standards.

Hereinafter, the disclosure relates to a method and an apparatus for discovering a sidelink relay terminal by a terminal which performs sidelink-based data transmission or reception in a wireless communication system. The disclosure provides an apparatus and a method for discovering a sidelink relay terminal which can relay data and signaling from a terminal performing data transmission and a terminal performing data reception according to sidelink unicast, sidelink groupcast, and sidelink broadcast in a wireless communication system.

Specifically, the disclosure provides a scheme of distinguishing a sidelink relay discovery message from data or signaling transmitted using another sidelink. According to an embodiment of the disclosure, the data or signaling transmitted using other sidelink may include at least one or a combination of PC5-S signaling (e.g., direct link establishment request, direct link establishment accept, direct security mode command, direct security mode complete, direct link release request, and direct link release accept) transmitted in a sidelink common control channel (SCCH) introduced for supporting an NR-V2X function and a PC5-RRC message (e.g., RRC reconfiguration sidelink, RRC reconfiguration complete sidelink, UE capability enquiry sidelink, and UE capability information sidelink). The sidelink relay discovery message may be transmitted through a sidelink signaling bearer, a logical channel, or a logical channel group separately from other sidelink data or signaling. The sidelink relay discovery message may be transmitted through a resource selected from a sidelink resource pool separate from other sidelink data or signaling. The sidelink relay discovery message may be indicated by sidelink control indication information (SCI) separate from other sidelink data or signaling. The disclosure may include an operation of receiving configuration of a reference to determine the necessity of a relay discovery supporting terminal-to-terminal direct communication, determining whether a relay discovery reference is satisfied, and performing a relay discovery procedure when the relay discovery reference is satisfied. According to an embodiment of the disclosure, the terminal performs an operation of discovering a sidelink relay so as to extend service coverage, increase the reliability of data transmission or reception, and minimize the use of a terminal battery.

In addition, specifically, according to an embodiment of the disclosure, a method for discovering a sidelink relay by a terminal in a wireless communication system may include: acquiring, by the terminal, configuration information required to discover a sidelink relay; determining whether a condition to perform a sidelink relay discovery is satisfied; monitoring acquisition of the sidelink relay discovery message when it is determined that the sidelink relay discovery is required; and configuring and transmitting a sidelink relay discovery request message when it is determined that the sidelink relay discovery is required.

Terms indicating a signal, terms indicating a channel, terms indicating control information, terms indicating network entities, terms indicating an element of a device, and the like, which are used in the following description, are exemplified for convenience of description. Accordingly, the disclosure is not limited to terms to be described below and other terms indicating objects having the equivalent technical meaning may be used.

Hereinafter, a base station is an entity that assigns resources of a terminal, and may be at least one of a gNode B, an eNode B, a Node B, a base station (BS), a wireless access unit, a base station controller, or a node on a network. A terminal may include a user equipment (UE), a mobile station (MS), a cellular phone, a smartphone, a computer, or a multimedia system capable of performing a communication function. However, this is merely an example, and the base station and the terminal are not limited by such an example. In the disclosure, for convenience of description, the "eNB" may be interchangeably used with the "gNB". That is, the base station described with the term "eNB" may be indicated as the "gNB". In the disclosure, the term "terminal" may indicate various wireless communication devices in addition to a mobile phone, an NB-IoT devices, and sensors.

Hereinafter, a physical channel and a signal may be interchangeable used with data or a control signal. For example, a physical downlink shared channel (PDSCH) is a term referring to a physical channel through which data is transmitted, but the PDSCH may be also used to refer to data. That is, in the disclosure, the expression "transmitting a physical channel" may be understood to have the same meaning as the expression "transmitting data or a signal through a physical channel".

Hereinafter, in the disclosure, higher-layer signaling indicates a method of transmitting a signal from a base station to a terminal by using a downlink data channel of a physical layer, or a method of transmitting a signal from a terminal to a base station by using an uplink data channel of a physical layer. The higher-layer signaling may be understood to be radio resource control (RRC) signaling or a media access control (MAC) control element (CE).

In addition, in the disclosure, to determine whether a specific condition is fulfilled, the expression of "equal to or more than" or "equal to or less than" has been used, but this is merely an example, and does not exclude a statement of "exceeding" or "less than". A condition stated as "equal to or more than" may be replaced with "exceeding", and a condition stated as "equal to or less than" may be replaced with "less than", and a condition stated as "equal to or more than and less than" may be replaced with "exceeding and equal to or less than".

In addition, the disclosure describes an embodiment by using terms used in some communication specifications (e.g., a 3rd generation partnership project (3GPP)), but this is merely an example. An embodiment of the disclosure may easily be altered and applied to other communication systems.

FIG. 1A illustrates a wireless communication system according to an embodiment of the disclosure.

FIG. 1A illustrates a base station 110, terminals 130 and 140, and a sidelink relay 120 which can relay data transmission or reception between the base station and the terminal, as a part of nodes using wireless channels in a wireless communication system. Here, the sidelink relay corresponds to a UE to network (U2N) relay. FIG. 1A illustrates that there is only one base station, another base station that is identical or similar to the base station 110 may be further included.

The base station 110 is a network infrastructure that provides wireless connection to the terminals 130 and 140 and the relay 120. The base station 110 has a coverage defined as a particular geographical area based on a distance by which the base station 110 can transmit a signal. The base station 110 may be called, in addition to "a base station," "an access point (AP)," "an eNodeB (eNB)," "a 5th generation (5G) node," "a next generation nodeB (gNB)," "a wireless point," "a transmission/reception point (TRP)," or another term having a technical meaning equivalent thereto.

The relay 120 is a device used by a user or a network infrastructure, and may perform communication with the base station 110 through a wireless channel. A link from the base station 110 to the relay 120 may be referred to as a downlink (DL), and a link from the relay 120 to the base station 110 may be referred to as an uplink (UL). The base station 110 and the relay 120 may be connected through a Uu interface. The UL means a wireless link through which the relay 120 transmits a data or control signal to the base station 110, and the DL means a wireless link through which the base station 110 transmits a data or control signal to the relay 120.

The relay 120 may perform communication through a wireless channel between the terminal 130 and the terminal 140. In this case, a link between the relay 120 and the terminal 130 and a link between the relay 120 and the terminal 140 may be referred to as a sidelink, and the sidelink may also be referred to as a PC5 interface.

Each of the terminals 130 and 140 is a device used by a user and communicates with the base station 110 through a wireless channel, or communicates with the relay 120 through a wireless channel. In the disclosure, only a case in which each of the terminal 130 and the terminal 140 communicates with the relay 120 through a wireless channel is illustrated. At least one of the terminal 130 and the terminal 140 may be operated without involvement of a user. That is, at least one of the terminal 130 and the terminal 140 is a device configured to perform machine-type communication (MTC) and may not be carried by a user. Each of the terminal 130 and the terminal 140 may be called, in addition to "a terminal," "a user equipment (UE)," "a mobile station," "a subscriber station," "a remote terminal," "a wireless terminal," "a user device," or another term having a technical meaning equivalent thereto.

Figure 1B:
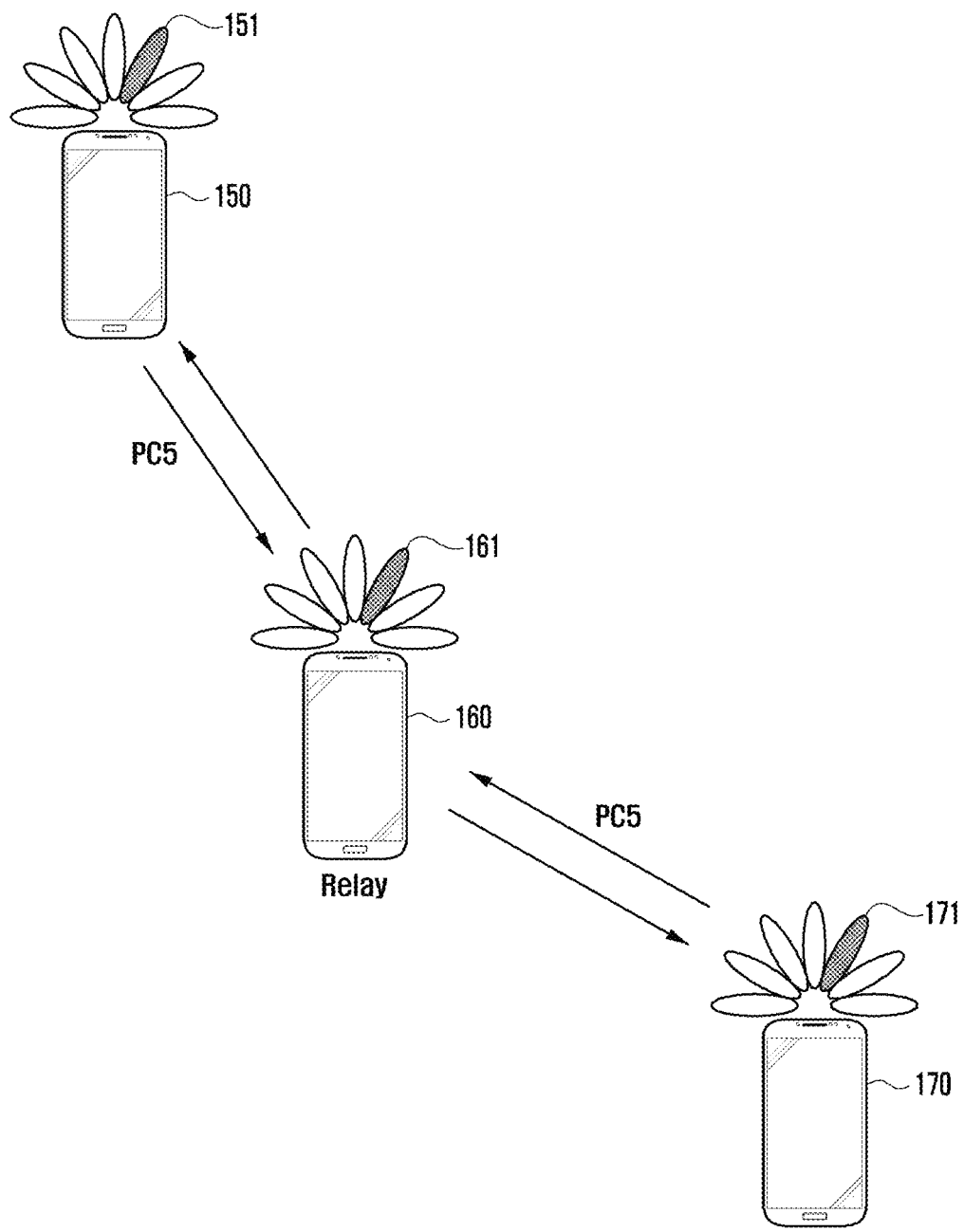
FIG. 1B illustrates a wireless communication system according to an embodiment of the disclosure.

FIG. 1B illustrates a wireless communication system according to an embodiment of the disclosure.

FIG. 1B illustrates a wireless communication system including terminals 150 and 170 and a sidelink relay 160 which can relay data transmission or reception between the terminals, as a part of nodes using wireless channels in a wireless communication system. Here, the sidelink relay 160 corresponds to a UE to UE (U2U) relay.

The relay 160 may communicates with the terminal 150 and the terminal 170 through a wireless channel. In this case, a link between the relay 160 and the terminal 150 and a link between the relay 160 and the terminal 170 may be referred to as a sidelink, and the sidelink may also be referred to as a PC5 interface.

Each of the terminal 150 and the terminal 170 is a device used by a user and may perform direct communication through a wireless channel or perform communication with a counterpart terminal through the relay 160 or a wireless channel. In this case, a link between the terminal 150 and the terminal 170, a link between the terminal 150 and the relay 160, and a link between the terminal 170 and the relay 160 may be referred to as a sidelink, and the sidelink may also be referred to as a PC5 interface.

At least one of the terminal 150 and the terminal 170 may be operated without involvement of a user. That is, at least one of the terminal 150 and the terminal 170 is a device configured to perform a machine-type communication (MTC) and may not be carried by a user. Each of the terminal 150 and the terminal 170 may be called, in addition to "a terminal," "a user equipment (UE)," "a mobile station," "a subscriber station," "a remote terminal," "a wireless terminal," "a user device," or another term having a technical meaning equivalent thereto.

In the description below, an uplink or a downlink, a Uu interface, a sidelink, and PC-5 may be interchangeably used.

The base station 110, the relays 120 and 160, and the terminals 130, 140, 150, and 170 illustrated in FIGS. 1A and 1B may transmit and receive a wireless signal in a millimeter wave (mmWave) band (e.g., 28 GHz, 30 GHz, 38 GHZ, and 60 GHz). In this case, in order to improve a channel gain, the base station 110, the relays 120 and 160, and the terminals 130, 140, 150, and 170 may perform beamforming. Here, the beamforming may include transmission beamforming and reception beamforming. That is, the base station 110, the relays 120 and 160, and the terminals 130, 140, 150, and 170 may assign directivity to a transmission signal or a reception signal. To this end, the base station 110, the relays 120 and 160, and the terminals 130, 140, 150, and 170 may select serving beams 112, 113, 121, 131, 141, 151, 161, and 171 via a beam discovery procedure or a beam management procedure. After the serving beams 112, 113, 121, 131, 141, 151, 161, and 171 are selected, communication may then be performed via resources that are in a quasi-co-located (QCL) relationship with resources at which the serving beams 112, 113, 121, 131, 141, 151, 161, and 171 are transmitted.

If it is possible to infer large-scale characteristics of a channel for transferring a symbol on a first antenna port, from a channel for transferring a symbol on a second antenna port, then it may be estimated that the first antenna port and the second antenna port are in a QCL relationship. For example, the large-scale characteristics may include at least one of a delay spread, a Doppler spread, a Doppler shift, an average gain, an average delay, and a spatial receiver parameter.

The terminal 130, the terminal 140, the terminal 150, and the terminal 170 illustrated in FIGS. 1A and 1B may support vehicle communication. In a case of the vehicle communication, in the LTE system, a standardization work for vehicle to everything (V2X) technology based on device-to-device (D2D) communication structure has been completed in 3GPP Release 14 and Release 15, and a standardization work for the V2X technology based on 5G NR has been completed in 3GPP release 16. In NR V2X, a terminal-to-terminal unicast communication, a groupcast (or multicast) communication, and a broadcast communication are supported. In addition, unlink the LTE V2X aiming to transmit or receive basic safety information required for road driving of vehicles, the NR V2X aims to provide more advanced services such as platooning, advanced driving, an extended sensor, and remote driving. A V2X service may be divided into a basic safety service and an advanced service. The basic safety service may include services from a vehicle notification (cooperative awareness messages (CAMs) or basic safety message (BSM)) service to detailed services such as a left turn notification service, a front vehicle crash alert service, an emergency vehicle approach notification service, a forward obstacle alert service, and an intersection signal information service, and V2X information may be transmitted or received using a broadcast, a unicast, or a groupcast transmission scheme. The advanced service not only enhances QoS safety requirements over the basic safety service, but also requires a scheme capable of transmitting or receiving V2X information by using the unicast and groupcast transmission schemes in addition to the broadcast transmission scheme in order to transmit or receive V2X information within a specific vehicle group or transmit or receive V2X information between two vehicles. The advanced service may include detailed services such as a platooning service, an autonomous driving service, a remote driving service, and an extended sensor-based V2X service. In addition, the NR V2X may support a direct communication service between terminals in an area where there is no network infrastructure so as to provide a public safety service.

Hereinafter, a sidelink (SL) refers to a signal transmission/reception path between terminals or a signal transmission/reception path between a terminal and a relay, and may be interchangeably used with a PC5 interface. Hereinafter, a base station is an entity that performs resource allocation of a terminal and a relay, and may be a base station supporting both V2X communication and general cellular communication, or a base station supporting only V2X communication. That is, the base station may refer to an NR base station (e.g., gNB), an LTE base station (e.g., eNB), or a road side unit (RSU). A terminal may include not only a general user equipment and a mobile station, but also a vehicle supporting vehicle-to-vehicle (V2V) communication, a pedestrian handset (for example, a smartphone) or a vehicle supporting vehicle-to-pedestrian (V2P) communication, a vehicle supporting vehicle-to-network (V2N) communication, a vehicle supporting vehicle-to-infrastructure (V2I) communication, an RSU equipped with a terminal function, an RSU equipped with a base station function, or an RSU equipped with a part of a base station function and a part of a terminal function.

In the disclosure, the terminal may mean a vehicle supporting a vehicular-to-vehicular (V2V) communication, a pedestrian handset (e.g., a smart phone) or a vehicle supporting vehicular-to-pedestrian (V2P) commination, a vehicle supporting vehicular-to-network (V2N) communication, or a vehicle supporting vehicular-to-infrastructure (V2I) communication. The terminal may mean a user device supporting device-to-device communication in a public safety network.

In addition, the terminal in the disclosure may mean a road side unit (RSU) equipped with a terminal function, an RSU equipped with a base station function, or an RSU equipped with a part of a base station function and a part of a terminal function.

In the disclosure, a relay may mean a vehicle supporting V2X communication or a user device supporting device-to-device communication in a public safety network. In addition, in the disclosure, a relay may mean a device in which a terminal function is mounted, a device in which a base station function is mounted, or a device in which a part of a terminal function and a part of a base station function are mounted.

Figure 2:
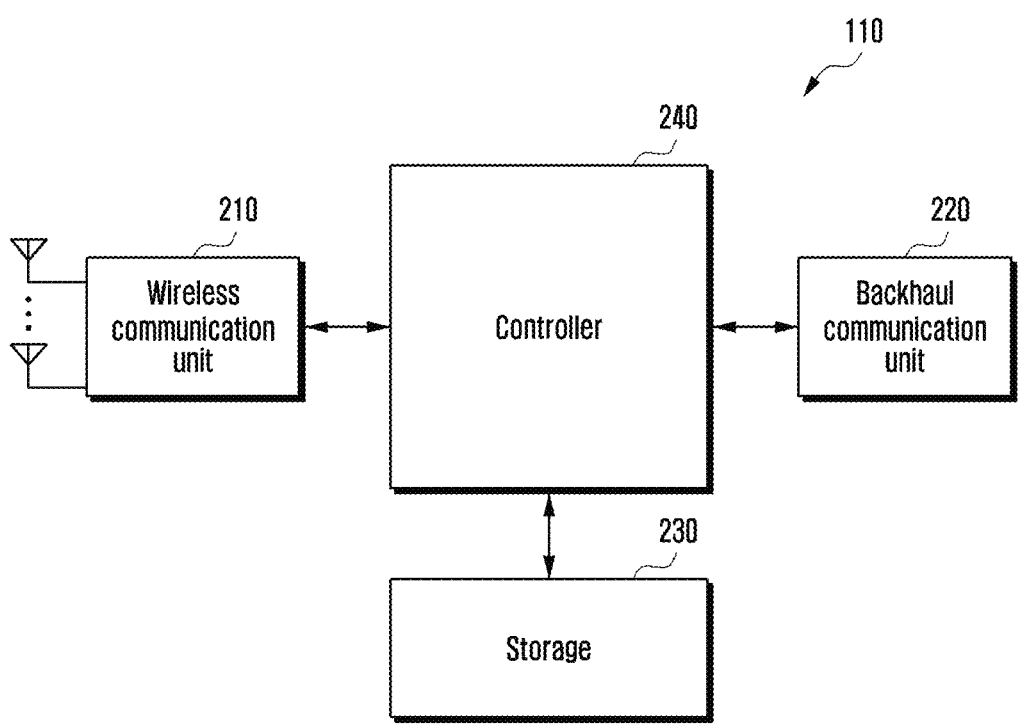
FIG. 2 illustrates a configuration of a base station in a wireless communication system according to an embodiment of the disclosure.

FIG. 2 illustrates a configuration of a base station in a wireless communication system according to an embodiment of the disclosure.

The configuration illustrated in FIG. 2 may be understood as a configuration of a base station 110. The term "-unit" or "-er" used hereinafter may refer to a unit for processing at least one function or operation and may be implemented in hardware, software, or a combination of hardware and software.

Referring to FIG. 2, the base station 110 may include a wireless communication unit 210, a backhaul communication unit 220, a storage 230, and a controller 240. However, elements of the base station 110 are not limited to the above-described example. For example, the base station may include more elements than the above-described elements or may include fewer elements than the above-described elements. In addition, the wireless communication unit 210, the backhaul communication unit 220, the storage 230, and the controller 240 may be implemented as a single chip. Furthermore, the controller 240 may include at least one processor.

The wireless communicator 210 performs functions for transmitting or receiving a signal through a wireless channel. For example, the wireless communication unit 210 may perform conversion between a baseband signal and a bit string according to physical layer specifications of a system. For example, for data transmission, the wireless communication unit 210 may generate complex symbols by encoding and modulating a transmission bit string. In addition, for data reception, the wireless communication unit 210 may reconstruct a reception bit string by demodulating and decoding a baseband signal.

In addition, the wireless communication unit 210 up-converts a baseband signal into a radio frequency (RF) band signal and then transmits the RF band signal through an antenna, and down-converts an RF band signal received through the antenna, into a baseband signal. To this end, the wireless communication unit 210 may include a transmission filter, a reception filter, an amplifier, a mixer, an oscillator, a digital-to-analog convertor (DAC), an analog-to-digital convertor (ADC), etc. In addition, the wireless communication unit 210 may include multiple transmission and reception paths. Furthermore, the wireless communication unit 210 may include at least one antenna array including multiple antenna elements.

In terms of hardware, the wireless communication unit 210 may be configured as a digital unit and an analog unit, and the analog unit may be configured as multiple sub-units according to operating power, an operating frequency, etc. The digital unit may be implemented as at least one processor (e.g., a digital signal processor (DSP)).

The wireless communication unit 210 may transmit and receive a signal as described above. Accordingly, all or a part of the wireless communication unit 210 may be referred to as a "transmitter," a "receiver," or a "transceiver." In addition, in the description below, transmission and reception performed through a wireless channel may be used to include meaning of performing of the above-described processing by the wireless communication unit 210.

The backhaul communication unit 220 provides an interface for performing communication with other nodes in a network. That is, the backhaul communication unit 220 converts a bit string into a physical signal, the bit string being transmitted from the base station to another node, for example, another access node, another base station, an upper node, a core network, etc., and converts a physical signal into a bit string, the physical signal being received from another node.

The storage 230 stores basic programs, application programs, and data, such as configuration information for operation of the base station 110. The storage 230 may be configured as a volatile memory, a non-volatile memory, or a combination of a volatile memory and a non-volatile memory. Furthermore, the storage 230 provides stored data upon a request from the controller 240.

The controller 240 controls overall operations of the base station 110. For example, the controller 240 transmits and receives a signal via the wireless communication unit 210 or the backhaul communication unit 220. In addition, the controller 240 may record data to or read data from the storage 230. The controller 240 may perform protocol stack functions required by the communication specifications. According to another implantation example, the protocol stack may be included in the wireless communication unit 210. To this end, the controller 240 may include at least one processor. According to embodiments, the controller 240 may control the base station 110 to perform operations according to embodiments to be described below.

Figure 3:
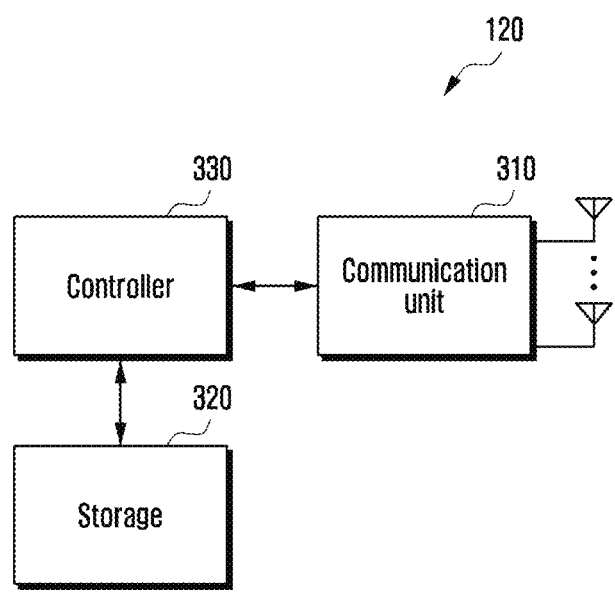
FIG. 3 illustrates a configuration of a terminal in a wireless communication system according to an embodiment of the disclosure.

FIG. 3 illustrates a configuration of a terminal in a wireless communication system according to an embodiment of the disclosure.

The configuration illustrated in FIG. 3 may be understood as a configuration of a terminal 120. The term "-unit" or "-er" used hereinafter may refer to a unit for processing at least one function or operation and may be implemented in hardware, software, or a combination of hardware and software.

Referring to FIG. 3, the terminal 120 may include a communication unit 310, a storage 320, and a controller 330. However, elements of the terminal 120 are not limited to the above-described example. For example, the terminal 120 may include more elements than the above-described elements or may include fewer elements than the above-described elements. In addition, the communication unit 310, the storage 320, and the controller 330 may be implemented as a single chip. Furthermore, the controller 330 may include one or more processors.

The communication unit 310 may perform functions for transmitting and receiving a signal through a wireless channel. For example, the communication unit 310 may perform conversion between a baseband signal and a bit string according to physical layer specifications of a system. For example, for data transmission, the communication unit 310 generate complex symbols by encoding and modulating a transmission bit string. In addition, for data reception, the communication unit 310 may reconstruct a reception bit string by demodulating and decoding a baseband signal. In addition, the communication unit 310 may up-convert a baseband signal into an RF band signal and then transmit the RF band signal through an antenna, and down-convert an RF band signal received through the antenna, into a baseband signal. For example, the communication unit 310 may include a transmission filter, a reception filter, an amplifier, a mixer, an oscillator, a DAC, an ADC, etc.

In addition, the communication unit 310 may include multiple transmission and reception paths. Furthermore, the communication unit 310 may include at least one antenna array including multiple antenna elements. In terms of hardware, the communication unit 310 may be implemented as a digital circuit and an analog circuit (e.g., an RF integrated circuit (RFIC)). In this case, the digital circuit and the analog circuit may be implemented as a single package.

The communication unit 310 may include multiple RF chains. Furthermore, the communication unit 310 may perform beamforming.

The communication unit 310 may transmit and receive a signal as described above. Accordingly, all or a part of the communication unit 310 may be referred to as a "transmitter," a "receiver," or a "transceiver." In addition, in the descriptions below, transmission and reception performed through a wireless channel may be used to include meaning of performing of the above-described processing by the communication unit 310.

The storage 320 stores basic programs, application programs, and data such as configuration information for operation of the terminal 120. The storage 320 may be configured as a volatile memory, a non-volatile memory, or a combination of a volatile memory and a non-volatile memory. The storage 320 provides stored data upon a request from the controller 330.

The controller 330 controls overall operations of the terminal 120. For example, the controller 330 may transmit and receive a signal via the communication unit 310. The controller 330 records data to or reads data from the storage 320. The controller 330 may perform protocol stack functions required by the communication specifications. To this end, the controller 330 may include at least one processor or microprocessor or may be a part of a processor. In addition, a part of the communication unit 310 and the controller 330 may be referred to as a communication processor (CP). According to embodiments, the controller 330 may control the terminal 120 to perform operations according to embodiments to be described below.

Figure 4:
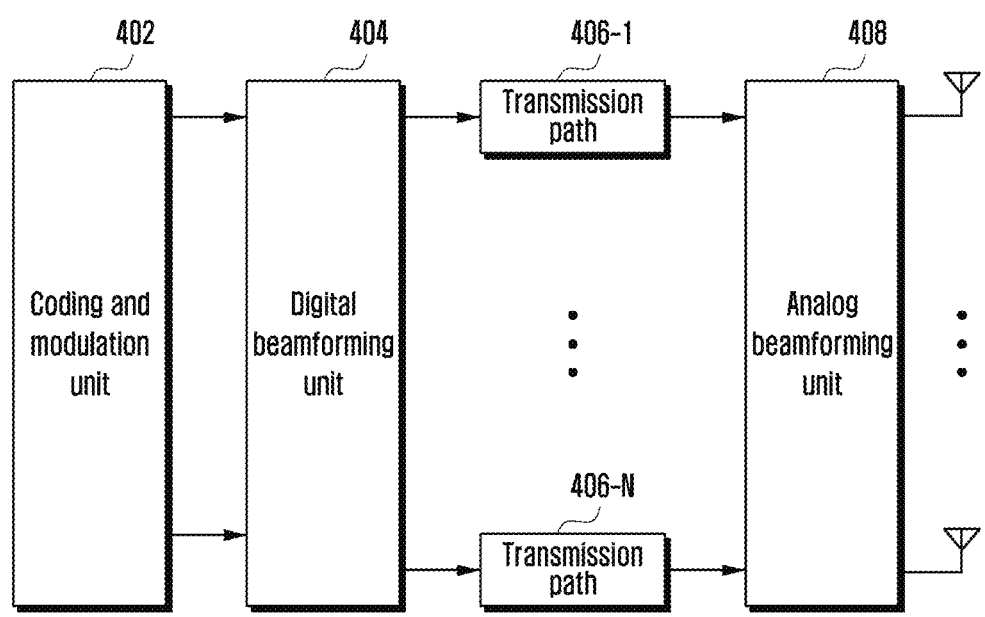
FIG. 4 illustrates a configuration of a communication unit in a wireless communication system according to an embodiment of the disclosure.

FIG. 4 illustrates a configuration of a communication unit in a wireless communication system according to an embodiment of the disclosure.

FIG. 4 illustrates an example of a detailed configuration of the wireless communication unit 210 of FIG. 2 and the communication unit 310 of FIG. 3. Specifically, FIG. 4 illustrates elements for performing beamforming as a part of the wireless communication unit 210 of FIG. 2 or the communication unit 310 of FIG. 3.

Referring to FIG. 4, the wireless communication unit 210 or the communication unit 310 may include a coding and modulation unit 402, a digital beamforming unit 404, multiple transmission paths 406-1 to 406-N, and an analog beamforming unit 408.

The coding and modulation unit 402 may perform channel encoding. For the channel encoding, at least one of a low density parity check (LDPC) code, a convolution code, or a polar code may be used. The coding and modulation unit 402 generates modulated symbols by performing constellation mapping.

The digital beamforming unit 404 may perform beamforming for a digital signal (e.g., the modulated symbols). To this end, the digital beamforming unit 404 multiplies the modulated symbols by beamforming weights. Here, the beamforming weights are used to change the magnitude and the phase of a signal, and may be referred to as a "precoding matrix," a "precoder," etc. The digital beamforming unit 404 may output modulated symbols that are digitally-beamformed, through the multiple transmission paths 406-1 to 406-N. According to a multiple-input multiple-output (MIMO) transmission technique, the modulated symbols may be multiplexed or the same modulated symbols may be provided to the multiple transmission paths 406-1 to 406-N.

The multiple transmission paths 406-1 to 406-N may convert digitally-beamformed digital signals to analog signals. To this end, each of the multiple transmission paths 406-1 to 406-N may include an inverse fast Fourier transform (IFFT) operator, a cyclic prefix (CP) inserter, a DAC, and an up-converter. The CP inserter is for an orthogonal frequency division multiplexing (OFDM) scheme, and may be excluded when another physical layer scheme (e.g., filter bank multi-carrier (FBMC)) is applied. That is, the multiple transmission paths 406-1 to 406-N may provide independent signal processing processes to multiple streams generated through digital beamforming. However, according to an implementation scheme, some elements of the multiple transmission paths 406-1 to 406-N may be commonly used.

The analog beamforming unit 408 may perform beamforming for an analog signal. To this end, the analog beamforming unit 408 may multiply the analog signals by beamforming weights. Here, the beamforming weights are used to change the magnitude and the phase of a signal. Specifically, the analog beamforming unit 408 may be variously configured according to connection structures between the multiple transmission paths 406-1 to 406-N and antennas. For example, each of the multiple transmission paths 406-1 to 406-N may be connected to one antenna array. In another example, the multiple transmission paths 406-1 to 406-N may be connected to one antenna array. In another example, the multiple transmission paths 406-1 to 406-N may also be adaptively connected to one antenna array or at least two antenna arrays.

Figure 5:
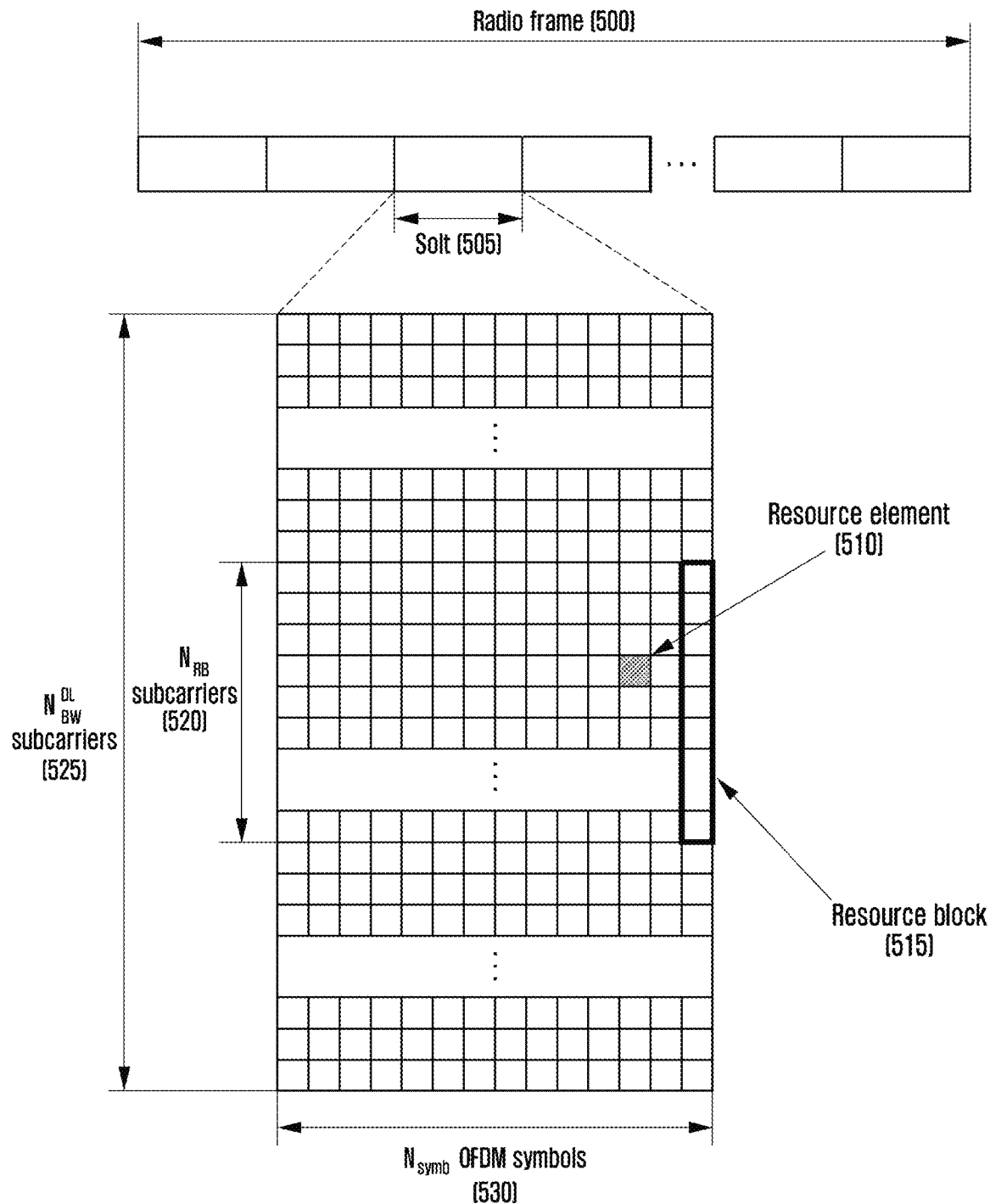
FIG. 5 illustrates a structure of time-frequency resources in a wireless communication system according to an embodiment of the disclosure.

FIG. 5 illustrates a structure of time-frequency resources in a wireless communication system according to an embodiment of the disclosure.

Referring to FIG. 5, in a wireless resource area, a horizontal axis indicates a time domain, and a vertical axis indicates a frequency domain. The minimum transmission unit in the time domain is an OFDM symbol or a discrete Fourier transform spread OFDM (DFT-S-OFDM) symbol, and Nsymb OFDM symbols or Nsymb DFT-S-OFDM symbols 530 may be included in one slot 505. Unlike a slot, the length of a subframe in the NR system may be defined as 1.0 ms, and the length of a radio frame 500 may be defined as 10 ms. The minimum transmission unit in the frequency domain is a subcarrier, and the entire system transmission bandwidth may include a total of NBW subcarriers 525. Detailed values such as Nsymb and NBW may be variably applied depending on a system.

The basic unit of the time-frequency resource area is a resource element (RE) 510, and the RE may be represented by an OFDM symbol index, a DFT-S-OFDM symbol index, and a subcarrier index. A resource block (RB) 515 may be defined by NRB consecutive subcarriers 520 in the frequency domain. In general, the minimum transmission unit of data is units of RBs, and in the NR system, in general, Nsymb=14 and NRB=12.

The structure of the time-frequency resources in FIG. 5 is applicable to a Uu interface. In addition, the structure of the time-frequency resources in FIG. 5 is similarly applicable to sidelink communication.

A sidelink relay may be authorized to be used in at least one or a combination of a specific service, a specific terminal, a specific sidelink flow, a specific sidelink bearer, a specific unicast link, a specific source identifier, and a specific destination identifier. The sidelink relay may configure direct connection to an authorized terminal at an installed time point. When receiving a relay discovery message from the authorized terminal, the sidelink relay may configure direct connection to the corresponding terminal. Configuration information required for the sidelink relay to transmit or receive a relay discovery message may be acquired from the base station or may be preconfigured.

Next, a sidelink relay discovery procedure is described with reference to FIGS. 6A and 6B. The sidelink relay discovery procedure in FIGS. 6A and 6B can be applied to a UE-to-network (UE2NW) relay discovery procedure or a UE-to-UE (UE2UE) relay discovery procedure.

Figure 6A:
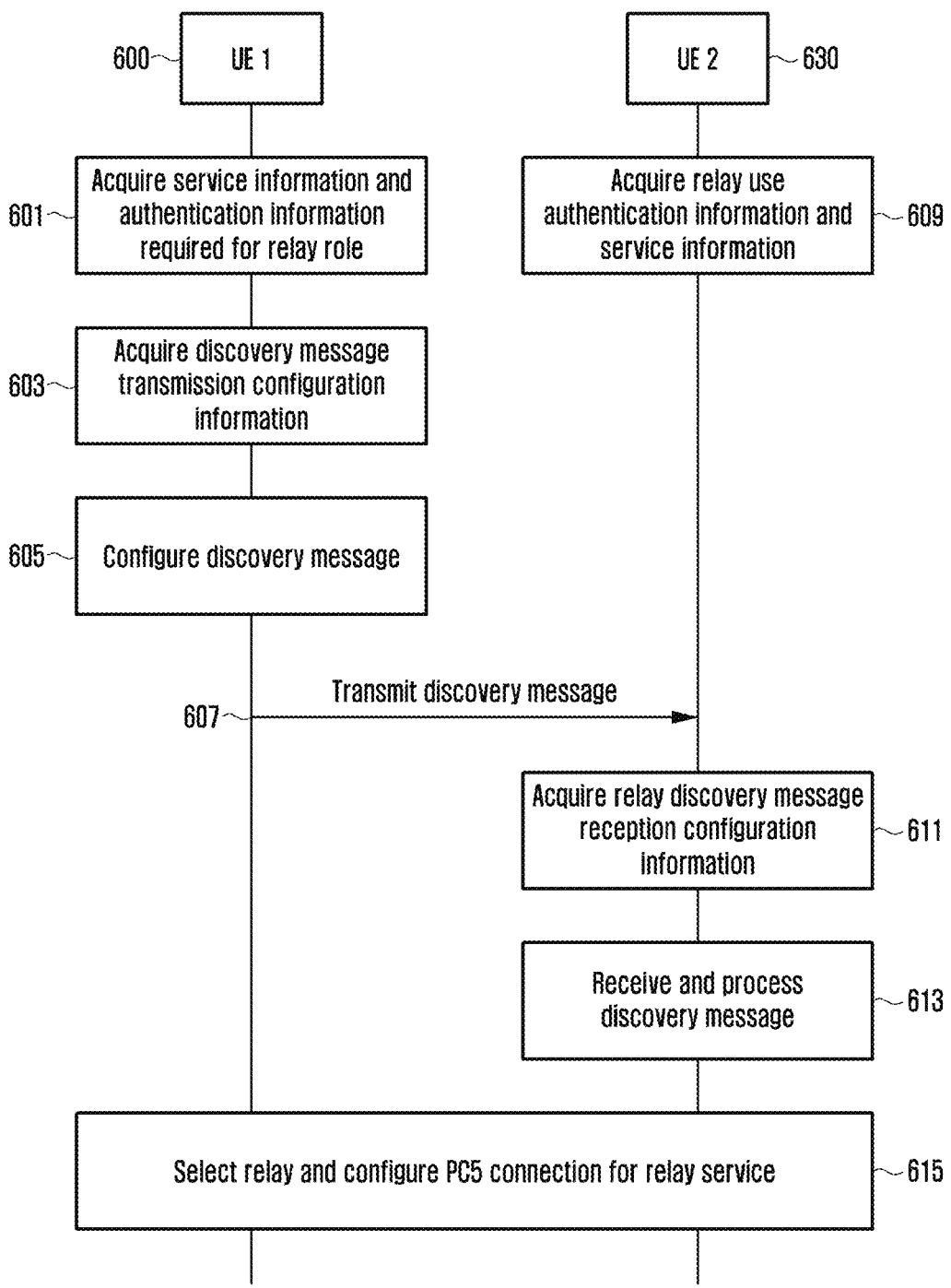
FIG. 6A illustrates a sidelink relay discovery procedure according to an embodiment of the disclosure.

FIG. 6A illustrates a sidelink relay discovery procedure according to an embodiment of the disclosure.

Referring to FIG. 6A, a UE 1 600 illustrates a terminal which functions as a sidelink relay, and a UE 2 630 illustrates a terminal which performs data transmission or reception with a base station or another terminal through a support from the sidelink relay. In operation 601, the UE 1 600 may acquire service information or authentication information required for a relay role. The information in operation 601 may be acquired through a core network or an operations, administration, and management (OAM) scheme. In operation 603, the UE 1 600 may acquire configuration information required to transmit a discovery message. The discovery message configuration information may include at least one or a combination of a transmission resource configuration (a frequency, a bandwidth part, and a resource pool), a configuration required to select a transmission resource (a parameter applied when a scheduling resource of the base station is selected or when the UE 1 directly selects a resource), a control of power for transmission of a discovery message, a transmission parameter, a retransmission parameter, modulation and coding scheme (MCS) information, a discovery message target service, a target group, a target destination, a target PQI list, and a target QoS parameter set list. In operation 605, the UE 1 600 may configure a discovery message. In operation 607, the UE 1 600 may transmit the discovery message. In the disclosure, the discovery message may be configured to be periodically transmitted. In the disclosure, the discovery message may be configured to be transmitted using the configuration information acquired in operation 603 above.

In operation 609, the UE 2 630 may acquire service information or authentication information required to perform relay-based communication. The information in operation 609 may be acquired through a core network or OAM scheme. In operation 611, the UE 2 630 may acquire configuration information required to receive a relay discovery message. The relay discovery message reception configuration information may include at least one or a combination of a reception resource configuration (a frequency, a bandwidth part, and a resource pool), a relay discovery message target service, a target group, a target destination, a target PQI (PC5 5QI) list, a target QoS parameter set list, a discovery message monitoring condition configuration, and discovery message reception time period configuration information. FIG. 6A illustrates that acquiring relay discovery message reception configuration information by the UE 2 630 is after the discovery message transmission in operation 607, but operation 611 may be performed from operation 609 independently from the operation of the UE 1 600. In operation 613, when the discovery message is received from the UE 1 600, the UE 2 630 may process the discovery message. When the UE 2 630 performs operation 613, if it is determined that a relay discovery condition is satisfied and a condition to monitor the discovery message is satisfied, the UE 2 630 may monitor discovery message reception. If a condition to select the UE 1 600 as a relay is satisfied after receiving the discovery message transmitted from the UE 1 600, the UE 2 630 may select the UE 1 600 as a relay and perform a sidelink connection configuration procedure with the UE 1 600 to receive a relay service of the UE 1 600, in operation

615. The sidelink connection configuration procedure may include a procedure of configuring a sidelink unicast connection with the UE 1 600 by using an NR-V2X technology.

Figure 6B:
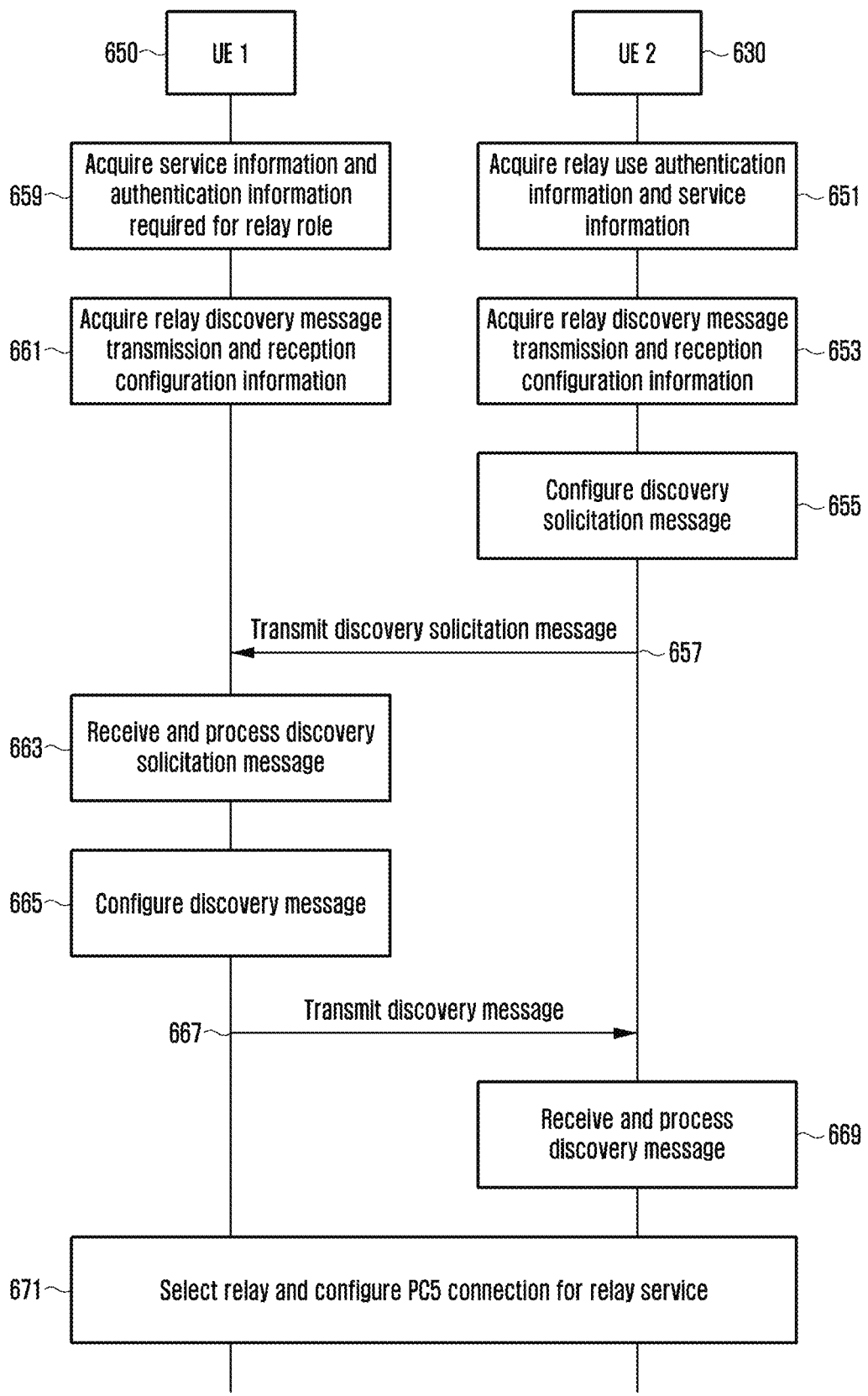
FIG. 6B illustrates a sidelink relay discovery procedure according to an embodiment of the disclosure.

FIG. 6B illustrates a sidelink relay discovery procedure according to an embodiment of the disclosure.

A UE 4 650 illustrates a terminal which functions as a sidelink relay, and a UE 3 680 illustrates a terminal which performs data transmission or reception with a base station or another terminal through a support from the sidelink relay.

In operation 651, the UE 3 680 may acquire service information or authentication information required to perform relay-based communication. The information in operation 651 may be acquired through a core network or OAM scheme. In operation 653, the UE 3 680 may acquire configuration information required to transmit and receive a relay discovery message, for example, configuration information required to receive a discovery message and configuration information required to transmit a discovery solicitation message. The relay discovery message reception configuration information may include at least one or a combination of a reception resource configuration (a frequency, a bandwidth part, and a resource pool), a relay discovery message target service, a target group, a target destination, a target PQI list, a target QoS parameter set list, a discovery message monitoring condition configuration, and discovery message reception time period configuration information. Configuration information required to transmit the relay discovery message may include at least one or a combination of a transmission resource configuration (a frequency, a bandwidth part, and a resource pool), a configuration required to select a transmission resource (a parameter applied when a scheduling resource of the base station is selected or when the UE 3 directly selects a resource), a control of power for transmission of a discovery solicitation message, a transmission parameter, a retransmission parameter, MCS information, a discovery solicitation message target service, a target group, a target destination, a target PQI list, and a target QoS parameter set list. If it is determined that a discovery solicitation message transmission condition to request transmission of a discovery message from the relay terminal is satisfied, the UE 3 680 may configure a discovery solicitation message in operation 655. The UE 3 680 may transmit the discovery solicitation message in operation 657.

In operation 659, the UE 4 650 may acquire service information or authentication information required for a relay role. The information in operation 651 may be acquired through a core network or an OAM scheme. In operation 661, the UE 4 650 may acquire configuration information required to transmit and receive a relay discovery message, for example, configuration information required to transmit a discovery message and configuration information required to receive a discovery solicitation message. The discovery message transmission configuration information may include at least one or a combination of a transmission resource configuration (a frequency, a bandwidth part, and a resource pool), a configuration required to select a transmission resource (a parameter applied when a scheduling resource of the base station is selected or when the UE 4 directly selects a resource), a control of power for transmission of a discovery message, a transmission parameter, a retransmission parameter, MCS information, a discovery message target service, a target group, a target destination, a target PQI list, and a target QoS parameter set list. The discovery solicitation message reception configuration information may include at least one or a combination of a reception resource configuration (a frequency, a bandwidth part, and a resource pool), a discovery solicitation message target service, a target group, a target destination, a target PQI list, a target QoS parameter set list, a discovery solicitation message monitoring condition configuration, and discovery solicitation message reception time period configuration information.

In operation 663, the UE 4 650 may monitor whether the discovery solicitation message is transmitted, and when the discovery solicitation message is received from the UE 3 680, may process the message. The embodiment of FIG. 6B describes that the UE 4 650 acquires information required to transmit the discovery message before operation 657, but the information may be acquired after a condition to transmit the discovery message is satisfied and the UE 4 650 determines to transmit the discovery message as a response to the discovery solicitation message in operation 663. In operation 665, the UE 4 650 may configure the discovery message. In operation 667, the UE 4 650 may transmit the discovery message. In the disclosure, the discovery message may be configured to be transmitted using the configuration information acquired in operation 661 above.

the UE 3 680 may process the discovery message in operation 669 when the discovery message is received from the UE 4 650. If a condition to select the UE 4 650 as a relay is satisfied after receiving the discovery message transmitted from the UE 4 650, the UE 3 680 may select the UE 4 650 as a relay and perform a sidelink connection configuration procedure with the UE 4 650 to receive a relay service of the UE 4 650, in operation 671. The sidelink connection configuration procedure may include a procedure of configuring a sidelink unicast connection with the UE 4 650 by using an NR-V2X technology.

According to an embodiment of the disclosure, a relay discovery message (a discovery message or a discovery solicitation message) used by a terminal corresponding to the relay in FIGS. 6A and 6B and a terminal to receive a relay service in a sidelink relay discovery procedure may be configured as follows. The relay discovery message may include one or a combination of pieces of information in [Table 1] below.

TABLE 1

(Information which can be included in the discovery message)

the services that relay UE can relay, (service ID, SL flow ID, SRC ID, DST ID, unicast link ID, PQI, SLRB ID, cast type)
the groups that relay UE belongs to
the possible DNNs/S-NSSAIs for the service relayed by relay UE
the serving PLMN for relay UE
the relay UE pre-configured in the remote UE
QoS parameter set of the service that relay can support
(Information which can be included in the discovery solicitation message)

the service that remote UE request to relay (service ID, SL flow ID, SRC ID, DST ID, unicast link ID, PQI, SLRB ID, group ID, cast type)
QoS parameter set of the service that remote UE request to relay
the serving PLMN for remote UE
the groups that remote UE belongs to Additionally, the relay discovery message (discovery message or discovery solicitation message) may include the following information.

The discovery solicitation message may include information on a resource pool (a frequency, BWP, and a resource pool) in which a terminal can receive the discovery message of the relay.

The discovery message may include information on a configuration (a relay discovery condition, see FIGS.

8A and 8B) of performing a relay discovery by a terminal, and information on a configuration (a relay selection condition, see FIGS. 8A and 8B) of performing a relay discovery and selecting a relay by a terminal.

The discovery message may include at least one or a combination of configuration information used when a terminal selects a relay and then transmits a message requesting a configuration of a direct connection with the relay, and resource information (a frequency, a BWP, and a resource pool).

(1) The relay discovery message may be transmitted through a sidelink common control channel (SCCH), but may be transmitted through a sidelink signaling bearer separately from other sidelink data or signaling which can be transmitted through the SCCH. Transmission or reception through the separate sidelink signaling bearer allows a terminal having received the relay discovery message to promptly filter out information required for a situation of the reception terminal by distinguishing the relay discovery message from the other sidelink data or signaling.

i. The relay discovery message may be transmitted through sidelink signaling bearer SL-SRB-M. For example, PC5-S signaling and PC5-RRC defined for the use of sidelink unicast are transmitted through SL-SRB0, SL-SRB1, SL-SRB2, and SL-SRB3, and thus SL-SRB-M may be configured as SL-SRB4.

ii. The relay discovery message may include the discovery message and the discovery solicitation message, wherein the discovery message may be transmitted through sidelink signaling bearer SL-SRB-M, and the discovery solicitation message may be transmitted through sidelink signaling bearer SL-SRB-N. SL-SRB-M may be configured as SL-SRB4, and SL-SRB-N may be configured as SL-SRB5.

iii. The relay discovery message may include a discovery message of model A (FIG. 6A) and a discovery solicitation message/discovery message of model B (FIG. 6B). The relay discovery message of model A may be transmitted through sidelink signaling bearer SL-SRB-M, and the relay discovery message of model B may be transmitted through sidelink signaling bearer SL-SRB-N. SL-SRB-M may be configured as SL-SRB4, and SL-SRB-N may be configured as SL-SRB5.

An example of SL-SRB-M configuration is shown in [Table 2] below.

TABLE 2

| Name | Value | Semantics description |
|---|---|---|
| PDCP configuration | | |
| >t-Reordering | Undefined | Selected by the receiving UE, up to UE implementation |
| >pdcp-SN-Size | 18 | |
| RLC configuration | | UM RLC |
| >sn-FieldLength | 6 | |
| >t-Reassembly | Undefined | Selected by the receiving UE, up to UE implementation |
| >logicalChannelIdentity | Integer value | |
| MAC configuration | | |
| priority | Integer value | |
| >prioritisedBitRate | infinity | |
| >logicalChannelGroup | Integer value | |
| >schedulingRequestId | Integer value | The scheduling request configuration with this value is applicable for this SCCH if configured by the network. |

An example of SL-SRB-N configuration is shown in [Table 3] below.

TABLE 3

| Name | Value | Semantics description |
|---|---|---|
| PDCP configuration | | |
| >t-Reordering | Undefined | Selected by the receiving UE, up to UE implementation |
| >pdcp-SN-Size | 18 | |
| RLC configuration | | UM RLC |
| >sn-FieldLength | 6 | |
| >t-Reassembly | Undefined | Selected by the receiving UE, up to UE implementation |
| >logicalChannelIdentity | Integer value | |
| MAC configuration | | |
| priority | Integer value | Same or lower value than priority of SL-SRB-M |
| >prioritisedBitRate | infinity | |
| >logicalChannelGroup | Integer value | |
| >schedulingRequestId | Integer value | The scheduling request configuration with this value is applicable for this SCCH if configured by the network, (same or different value than SL-SRB-M, same or different value than SL-SRB0, SL-SRB1, SL-SRB2, SL-SRB3) | iv. An embodiment of a PDCP PDU header including the relay discovery message corresponding to SL-SRB-M and SL-SRB-N is as follows.

A. Identical to the PDCP PDU header including PC5-S signaling corresponding to SL SRB0

Figure 12:
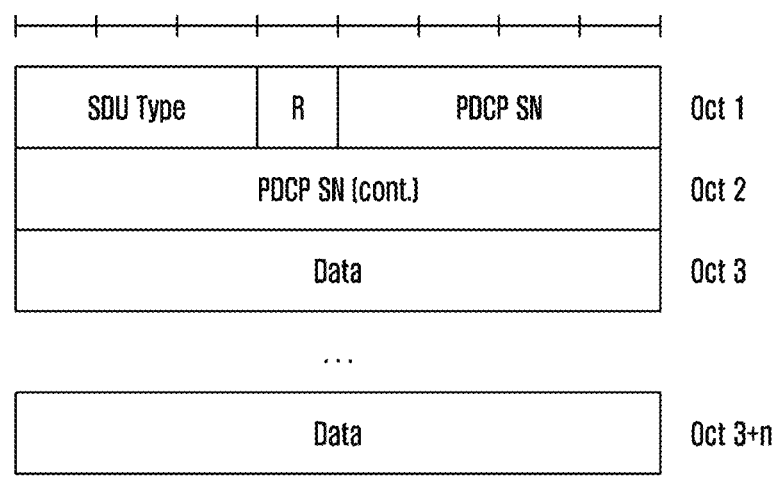
FIG. 12 illustrates an PDCP PDU header according to an embodiment of the disclosure.

An example is shown in FIG. 12. FIG. 12 illustrates an PDCP PDU header according to an embodiment of the disclosure.

B. Configured as R/PDCP SN/Data field (configured to include no PDCP SDU type)

Figure 13:
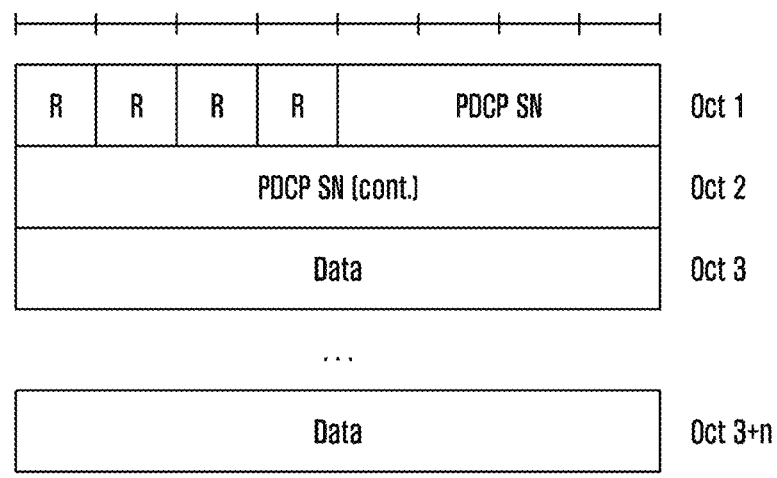
FIG. 13 illustrates an R/PDCP SN/Data field according to an embodiment of the disclosure.

An example is shown in FIG. 13. FIG. 13 illustrates an R/PDCP SN/Data field according to an embodiment of the disclosure.

C. Configured as a PDCP SN/Data field

Figure 14:
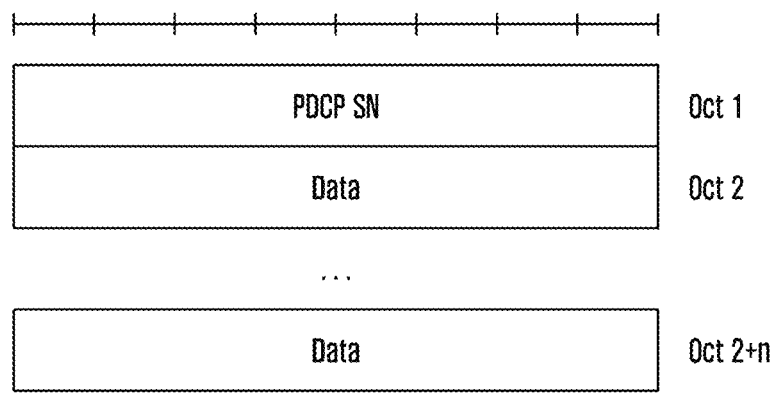
FIG. 14 illustrates an PDCP SN/Data field according to an embodiment of the disclosure.

An example is shown in FIG. 14. FIG. 14 illustrates an PDCP SN/Data field according to an embodiment of the disclosure.

D. Configured without a PDCP header when no fragmentation is supported.

(2) The relay discovery message and other sidelink data or signaling may be transmitted through an identical or separate sidelink logical channel group. In a case where different sidelink logical channel groups are configured for the relay discovery message and other sidelink data or signaling, when the base station receives an SL-buffer status report (BSR) including a sidelink transmission resource request from the terminal, the base station may distinguish the sidelink discovery message from the other sidelink data or signaling, and may utilize the same for sidelink resource scheduling. In a case where different sidelink logical channels are configured for sidelink discovery messages, respectively, when the base station receives SL-BSR including a sidelink transmission resource request from the terminal, the base station may distinguish each sidelink discovery message, and may utilize the same for sidelink resource scheduling.

i. The SL-SRB-M logical channel group may be configured as LCG0 corresponding to a value identical to SL SRB0, SL SRB1, SL SRB2, and SL SRB3.

ii. The SL-SRB-M logical channel group may be configured as a value, for example, LCG-X, which is different from SL SRB0, SL SRB1, SL SRB2, and SL SRB3.

iii. The SL-SRB-M and SL-SRB-N logical channel group may be configured with different values. For example, the SL-SRB-N logical channel group may be configured with LCG0 that is identical to SL SRB0/SL SRB1/SL SRB2/SL SRB3. The SL-SRB-M logical channel group may be configured with a value, for example, LCG-X, which is different from LCG0. For example, the SL-SRB-M logical channel group may be configured with LCG-X, and the SL-SRB-N logical channel group may be configured with LCG-Y.

iv. The SL-SRB-M and SL-SRB-N logical channel group may be configured with the same value. For example, the SL-SRB-M and SL-SRB-N logical channel group may be configured with LCG0. For example, the SL-SRB-M and the SL-SRB-N logical channel group may be configured with LCG-X.

(3) The relay discovery message may be transmitted through a logical channel that is separate from other sidelink data or signaling. For example, an SL-SRB-M logical channel identifier may be configured with X, and an SL-SRB-N logical channel identifier may be configured with Y. For example, a discovery message logical channel identifier of model A may be configured with A, a discovery solicitation message logical channel identifier of model B may be configured with B, and a discovery message logical channel identifier of model B may be configured with C.

(4) The same priority as that of PC5-S signal defined for the use of sidelink unicast connection may be configured for the relay discovery message (e.g., configured with priority=1), or a different priority value may be configured for the relay discovery message (that is, configured with one integer value of 2 to 8, and having a priority value lower than that of the PC5-S signaling defined for the use of the sidelink unicast). Additionally, separate priority values may be configured for the relay discovery message of model A and the relay discovery message of model B, wherein the relay discovery message of model A may be configured to have a priority value lower than that of the relay discovery message of model B. The relay discovery message of model A is periodically transmitted and the relay discovery message of model B is transmitted when a message transmission event occurs, and thus the relay discovery message of model B may be configured to have a higher priority. The priority of the sidelink discovery message may be used for the terminal to determine transmission priorities between the uplink and the sidelink, and may be used for the terminal to determine transmission priorities between the sidelink and the sidelink.

(5) When a base station schedules a transmission resource for transmitting the relay discovery message, SchedulingRequestID identical to that of other sidelink data or signaling may be configured to be used, or separate SchedulingRequestID may be configured.

(6) The sidelink relay discovery message (discovery message or discovery solicitation message) may be configured to be transmitted in SL SRB0 for transmitting PC5-S signaling (e.g., a direct link establishment request message) which is unprotected, that is, to which no integrity protection or encryption is applied. When the sidelink relay discovery message is transmitted, a PDCP SDU type may be configured with a value informing of the sidelink relay discovery message.

Figure 15:
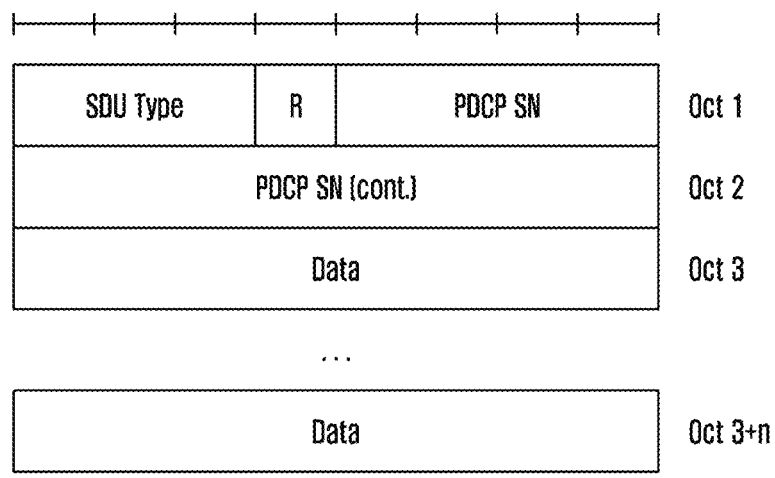
FIG. 15 illustrates an PDCP SDU type according to an embodiment of the disclosure.

An example is shown in FIG. 15. FIG. 15 illustrates an PDCP SDU type according to an embodiment of the disclosure.

The terminal may use the PDCP SDU type without disregard to distinguish the sidelink relay discovery message from other PC5-S signaling using SL-SRB0, that is, other PC5-S signaling may not use PDCP SDU type, and the sidelink relay discovery message may use the PDCP SDU type. When the PDCP SDU type is used to distinguish the sidelink relay discovery message, with respect to the discovery message and the discovery solicitation message, the terminal may configure the PDCP SDU type value with the same value or different values. The terminal may determine the relay discovery message according to frame type values of the discovery message and the discovery solicitation message, and may configure a PDCP SDU type value corresponding to the relay discovery message. When the terminal receives a PDCP PDU transmitted in SL-SRB0, a reception terminal may determine whether the message corresponds to other PC5-S message or the sidelink relay discovery message according to the PDCP SDU type value, and may perform an operation corresponding to each message.

(7) All configuration information relating to a sidelink signaling bearer configured for the sidelink discovery message may be transmitted through at least one of a dedicated RRC (e.g. . . . , RRCReconfiguration) and an SIB message transmitted by the base station.

(8) Some configuration information relating to the sidelink signaling bearer configured for the sidelink discovery message may be configured in default configuration as shown in [Table 2] and [Table 3], and some configuration information, for example, SchedulingRequestId, a logical channel group, and the priority utilized for scheduling of the sidelink transmission resource by the base station, may not be configured in [Table 2] or [Table 3], and may be configured through at least one of a dedicated RRC (e.g. . . . , RRCReconfiguration) and an SIB message transmitted by the base station.

(9) An indicator indicating the relay discovery message may be included in a sidelink MAC subheader (SL SCH MAC subheader). When the terminal acquires information indicating the relay discovery message from the sidelink MAC subheader, the terminal may filter out the received sidelink relay discovery message. When a reception terminal corresponds to a target terminal of the sidelink relay discovery message, the terminal may promptly process the received sidelink relay discovery message. When it is determined that the reception terminal does not correspond to the target terminal of the sidelink relay discovery message, the terminal may disregard the received sidelink relay discovery message.

Figure 16:
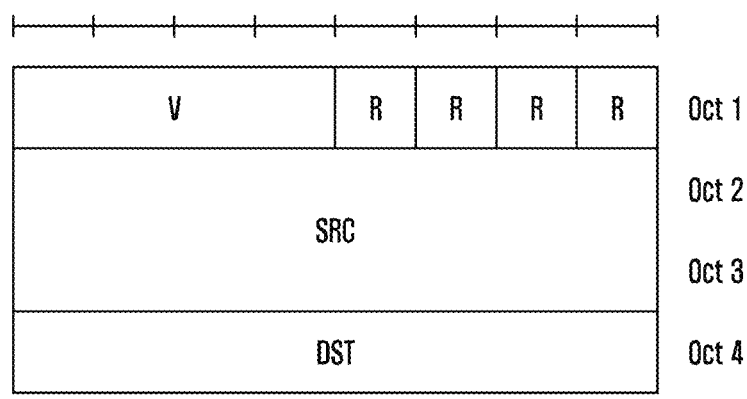
FIG. 16 illustrates a sidelink MAC subheader according to an embodiment of the disclosure.

An example is shown in FIG. 16. FIG. 16 illustrates a sidelink MAC subheader according to an embodiment of the disclosure.

i. The entire V field or a part of the V field may be used as information indicating the sidelink relay discovery message. Additionally, the V field may be used to indicate each of the discovery message and the discovery solicitation message.

ii. An R field may be used as information indicating the sidelink relay discovery message. Additionally, the R field may be used to indicate each of the discovery message and the discovery solicitation message.

iii. Each of or a combination of an SRC field or a DST field may be used as information indicating the sidelink relay discovery message.

iv. For example, the SL SCH MAC subheader of the sidelink relay discovery message may include a full SRC Id and a full DST ID. In this case, SCI (indicating sidelink control information) may not include an SRC ID and DST ID, or may include a part of the SRC ID and a part of the DST ID.

Figure 17:
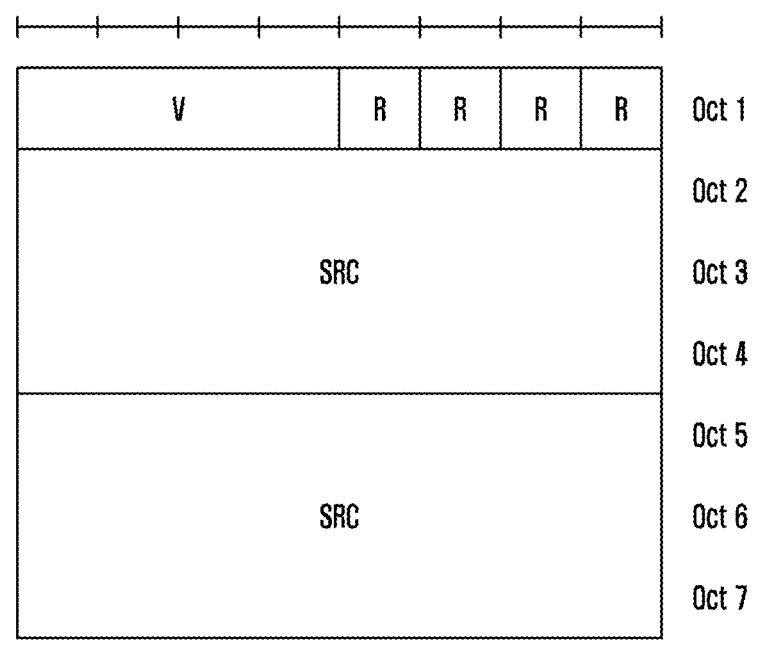

An example is shown in FIG. 17. FIG. 17 illustrates a SL SCH MAC subheader according to an embodiment of the disclosure.

v. For example, when the SCI (indicating sidelink control information) includes the full SRC ID and the full DST ID, the SL SCH MAC subheader may not include the SRC ID and the DST ID. In this case, a header of the SL MAC subPDU may include an R/F/LCID/L field. Additionally, the SL SCH MAC subheader of the SL MAC PDU corresponding to the sidelink relay discovery message may include a V/R field as shown below, or the SL MAC PDU may be transmitted without the SL SCH MAC subheader.

Figure 18:
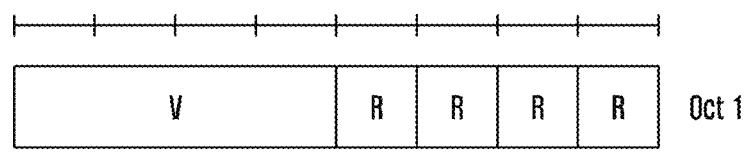
FIG. 18 illustrates a SL SCH MAC subheader without SRC ID and DST ID according to an embodiment of the disclosure.

An example is shown in FIG. 18. FIG. 18 illustrates a SL SCH MAC subheader without SRC ID and DST ID according to an embodiment of the disclosure.

According to an embodiment, when a sidelink relay discovery message and a general sidelink data or signaling need to be transmitted to the same target terminal or a terminal to receive a target service, the relay discovery message and the normal sidelink message may be multiplexed into one MAC PDU. In this case, the MAC PDU may include an SL SCH MAC subheader including an SRC ID field and a DST ID (information indicating a target terminal, a target service, or a target group) field.

When transmitting the sidelink discovery message, a transmission terminal may indicate transmission of the sidelink discovery message by using configuration information of SCI (indicating sidelink control information). A reception terminal may perform filtering, wherein the reception terminal determines the sidelink discovery message by using the configuration information of the SCI (indicating sidelink control information) and determines whether the sidelink discovery message is necessary or unnecessary.

Additionally, when the terminal is configured to select a sidelink relay according to reference signal received power (RSRP) measurement of the sidelink discovery message, the terminal may perform the RSRP measurement for a resource indicated by SCI which informs of sidelink discovery message transmission indication. In another embodiment, the terminal may perform the RSRP measurement for the SCI informing of the sidelink discovery message transmission indication and select the sidelink relay according to the RSRP measurement.

Additionally, when the terminal is configured to perform an operation of transmitting or receiving a sidelink discovery message according to the sidelink RSRP measurement, a transmission terminal which performs a sidelink relay function may transmit SCI for the use of the sidelink discovery message, and a reception terminal which discovers a sidelink relay may measure RSRP for a sidelink resource indicated by the SCI for the use of the sidelink discovery message. In another embodiment, the terminal may perform the RSRP measurement for the SCI informing of the sidelink discovery message transmission indication, and may determine the necessity of sidelink relay discovery message transmission or reception according to the RSRP measurement.

Embodiments of the SCI indicating sidelink discovery message transmission may include at least one or a combination of (1), (2), and (3) below.

(1) A reserved filed of SCI 1-A used in NR-V2X as shown in [Table 4] below may be used. A left X bit or a right X bit in the reserved field may be configured with a value other than 0 when the reserved field is used as sidelink discovery message indication information. When the reserved field is used as the sidelink discovery message indication information, the number of bits to be used may vary depending on a case where each of the discovery message and the discovery solicitation message is indicated and a case where sidelink discovery messages are not distinguished from each other.

TABLE 4

Priority - 3 bits as defined in clause 5.4.3.3 of [12, TS 23.287].

Frequency resource assignment $- \left\lceil \log_2\left(\frac{N_{subChannel}^{SL}\left(N_{subChannel}^{SL} + 1\right)}{2}\right) \right\rceil$ bits when the value of the higher layer parameter sl-MaxNumPerReserve is configured to 2; otherwise $\left\lceil \log_2\left(\frac{N_{subChannel}^{SL}\left(N_{subChannel}^{SL} + 1\right)\left(2N_{subChannel}^{SL} + 1\right)}{6}\right) \right\rceil$ bits when the value of the higher layer parameter sl-MaxNumPerReserve is configured to 3, as defined in clause 8.1.2.2 of [6, TS 38.214].

Time resource assignment - 5 bits when the value of the higher layer parameter sl-MaxNumPerReserve is configured to 2; otherwise 9 bits when the value of the higher layer parameter sl-MaxNumPerReserve is configured to 3, as defined in clause 8.1.2.1 of [6, TS 38.214].

Resource reservation period - $\lceil \log_2 N_{rsv_{period}} \rceil$ bits as defined in clause 8.1.4 of [6, TS 38.214], where $N_{rsv_{period}}$ is the number of entries in the higher layer parameter sl-ResourceReservePeriodList, if higher layer parameter sl-MultiReserveResource is configured; 0 bit otherwise.

DMRS pattern - $\lceil \log_2 N_{pattern} \rceil$ bits as defined in clause 8.4.1.1.2 of [4, TS 38.211], where $N_{pattern}$ is the number of DMRS patterns configured by higher layer parameter sl-PSSCH-DMRS-TimePatternList; 0 bit if sl-PSSCH-DMRS-TimePatternList is not configured.

$2^{nd}$-stage SCI format - 2 bits as defined in Table 8.3.1.1-1.

Beta_offset indicator - 2 bits as provided by higher layer parameter sl-BetaOffsets2ndSCI and Table 8.3.1.1-2.

Number of DMRS port - 1 bit as defined in Table 8.3.1.1-3.

Modulation and coding scheme - 5 bits as defined in clause 8.1.3 of [6, TS 38.214].

Additional MCS table indicator - as defined in clause 8.1.3.1 of [6, TS 38.214]: 1 bit

TABLE 4-continued if one MCS table is configured by higher layer parameter sl-Additional-MCS-Table; 2 bits if two MCS tables are configured by higher layer parameter sl-Additional-MCS-Table; 0 bit otherwise.

PSFCH overhead indication - 1 bit as defined clause 8.1.3.2 of [6, TS 38.214] if higher layer parameter sl-PSFCH-Period = 2 or 4; 0 bit otherwise.

Reserved - a number of bits as determined by higher layer parameter sl-NumReservedBits, with value set to zero.

(2) Separate SCI may be defined for the use of indication of the sidelink discovery message. The SCI may be configured as, for example, 2nd stage SCI, and may be defined as SCI format 2-C.

Information indicating SCI format 2-C may be configured in the 2nd-stage SCI format field of SCI 1-A in [Table 4]. For example, the 2nd-stage SCI format field value may be configured with 10 or 11 other than 00 and 01 that are being used for the existing NR-V2X function.

An example of SCI format 2-C is shown in [Table 5] below.

TABLE 12

HARQ process number - $\lceil \log_2 N_{process} \rceil$ bits as defined in clause 16.4 of [5, TS 38.213].
New data indicator - 1 bit as defined in clause 16.4 of [5, TS 38.213].
Redundancy version - 2 bits as defined in clause 16.4 of [6, TS 38.214].
Source ID as defined in clause 8.1 of [6, TS 38.214].
Destination ID as defined in clause 8.1 of [6, TS 38.214].

When HARQ retransmission is not applied to the sidelink relay discovery message, SCI format 2-C for the use of the sidelink relay discovery message may not include and may not configure an HARQ process number, a new data indicator, a redundancy version field in [Table 5]. In another embodiment, when the HARQ retransmission is not applied to the sidelink relay discovery message, a transmission terminal may configure the HARQ process number, new data indicator, and redundancy version field values in [Table 5] with 0 and transmit SCI 2-C.

According to an embodiment, for a source ID and a destination ID in [Table 5], SCI 2-C indicating the sidelink relay discovery message may be configured to include a full SRC ID and a full DST ID, may be configured to include a part of the SRC ID and a part of the DST ID, or may be configured to include neither the SRC ID nor the DST ID.

(3) The sidelink relay discovery message indication information may use a cast type indicator field of SCI 2-A used in NR-V2X as shown in [Table 6]. A transmission terminal which transmits the sidelink relay discovery message may configure a cast type indicator field value with 11, and transmit SCI 2-A. When SCI 2-A is transmitted for transmission of the sidelink relay discovery message, the transmission terminal may configure, with 0, a value of an unnecessary field, for example, at least one or a combination of an HARQ process number, a new data indicator, a redundancy version, a CSI request, and an HARQ feedback enabled/disabled indicator.

TABLE 13

HARQ process number - $\lceil \log_2 N_{process} \rceil$ bits as defined in clause 16.4 of [5, TS 38.213].
New data indicator - 1 bit as defined in clause 16.4 of [5, TS 38.213].
Redundancy version - 2 bits as defined in clause 16.4 of [6, TS 38.214].
Source ID - 8 bits as defined in clause 8.1 of [6, TS 38.214].
Destination ID - 16 bits as defined in clause 8.1 of [6, TS 38.214].

TABLE 13-continued

HARQ feedback enabled/disabled indicator - 1 bit as defined in clause 16.3 of (5, TS 38.213].
Cast type indicator - 2 bits as defined in Table 8.4.1.1-1.
CSI request - 1 bit as defined in clause 8.2.1 of [6, TS 38.214].

According to an embodiment of the disclosure, a transmission resource pool or a reception resource pool of the sidelink relay discovery message may be configured separately from a transmission resource pool or a reception resource pool for transmitting or receiving general sidelink data or signaling. The transmission resource pool or the reception resource pool of the sidelink relay discovery message may be configured in a resource pool in which no HARQ feedback resource is included. The transmission resource pool or the reception resource pool of the sidelink relay discovery message may be configured in a bandwidth part (BWP) identical to or different from that of the transmission resource pool or the reception resource pool for transmitting or receiving the general sidelink data or signaling. The transmission resource pool or the reception resource pool of the sidelink relay discovery message may be configured in a frequency band identical to or different from that of the transmission resource pool or the reception resource pool for transmitting or receiving the general sidelink data or signaling.

When the resource pool, the BWP, or the frequency band of the sidelink relay discovery message is configured separately from the resource pool for transmitting or receiving the general sidelink data or signaling, a terminal for transmitting the discovery message may transmit a discovery message in a separate sidelink resource and select the terminal as a relay according to the discovery message, and may monitor the BWP or the frequency band in which the transmission resource pool or the reception resource pool for transmitting or receiving the general sidelink data or signaling is configured in order to receive a direct connection request message that is transmitted by a terminal with which a sidelink connection is to be configured. In a case where the resource pool, the BWP, or the frequency band of the sidelink relay discovery message is configured separately from the resource pool for transmitting or receiving the general sidelink data or signaling, when a terminal for receiving the discovery message to discover or select a sidelink relay receives the discovery message in a separate sidelink resource and determines to configure a sidelink connection by selecting, as a relay, the terminal which has transmitted the discovery message, the terminal may acquire a transmission resource in the BWP or the frequency band in which the transmission resource pool or the reception resource pool for transmitting or receiving the general sidelink data or signaling is configured to transmit a direct connection request message to the relay terminal.

According to an embodiment of the disclosure, a transmission resource pool or a reception resource pool for transmitting or receiving a discovery message of model A and a transmission resource pool or a reception resource pool for transmitting or receiving a discovery solicitation message or a discovery message of model B may be separately configured. The discovery message of model A may be periodically transmitted and the discovery solicitation message or the discovery message of model B may be transmitted when a condition of a predetermined event (e.g., an event which is to request discovery message transmission from the relay terminal by the target terminal) is satisfied, and thus a sidelink resource which can transmit or receive the discovery message of model A may be configured in a separate transmission resource pool, reception resource pool, frequency, and BWP. A sidelink resource which can transmit or receive the discovery solicitation message or the discovery message of model B may be configured in a transmission resource pool, a reception resource pool, a frequency, and a BWP for transmitting or receiving the general sidelink data or signaling.

When the sidelink relay discovery message is configured in a resource pool, a BWP, or a frequency band that is different from that of the general sidelink data or signaling, there is an advantage in that the transmission reliability is increased by not increasing the congestion of the resource pool use, but there are disadvantages in that a resource may be wasted when the transmission frequency of the relay discovery message is low and a case where separate hardware is to be added to transmit or receive the sidelink relay discovery message may occur.

Figure 7:
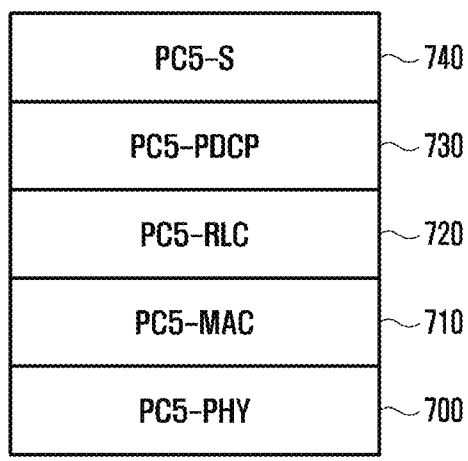
FIG. 7 illustrates a protocol structure of a sidelink relay discovery message according to an embodiment of the disclosure.

FIG. 7 illustrates a protocol structure of a sidelink relay discovery message according to an embodiment of the disclosure.

Referring to FIG. 7, a protocol structure of a sidelink relay discovery message may include a PHY layer 700, a MAC layer 710, an RLC layer 720, a PDCP layer 730, and a PC5-S layer 740. The protocol structure of the sidelink relay discovery message includes no SDAP layer, wherein no SDAP entity of the use of the sidelink relay discovery message is configured.

As illustrated in FIG. 1, a relay may correspond to a UE-to-NW (U2N) relay providing a connection between a terminal and a base station/network, or a UE-to-UE relay providing a connection between terminals. A condition to perform a relay discovery by the terminal may be differently applied to the U2N relay and the U2U relay, and is determined in consideration of whether there is a need for the terminal to consider an interface (Uu) with the base station for a relay discovery condition. For example, in the case of the U2N relay, the terminal may configure a direct connection to the base station or may configure a connection to the base station through a relay, and thus the state of a link between the base station and the terminal may be used as a condition to select the U2N relay. In addition, a condition to select the U2N relay may vary depending on an RRC connection state (RRC_IDLE, RRC_INACTIVE, RRC_CONNECTED, and out-of-coverage) of the terminal. In the case of the U2U relay, the terminal may configure a direct connection to another terminal regardless of a connection to the base station, or may configure a connection to another terminal through a relay, and thus, the state of the link between the base station and the terminal or the RRC connection state of the terminal are not needed to be used as a condition to select the U2U relay.

The same sidelink relay discovery condition and procedure in a communication system supporting the U2U relay may be applied to a source terminal and a target terminal. Configuration information which can be used to transmit or receive the sidelink relay discovery message may be acquired from the base station or information preconfigured for the terminal may be used as the configuration information. A data transmission or reception scheme of the source terminal and the target terminal may include a sidelink unicast, a sidelink groupcast, and a sidelink broadcast, and the data transmission or reception scheme may be supported through a relay service of a sidelink relay. A measurement method used to perform the sidelink relay discovery may include RSRP measurement for a sidelink regardless of the data transmission or reception scheme. The terminal may acquire RSRP threshold configuration information relating to the sidelink to perform the sidelink relay discovery.

The sidelink relay may acquire information required to transmit or receive the sidelink discovery message from the base station or may be acquired from the preconfigured information. The sidelink relay may determine whether a condition allowing transmission or reception of the sidelink discovery message is satisfied, wherein the sidelink discovery message transmission or reception condition and parameter configuration may be acquired from the base station or may be acquired from preconfigured information. For example, when transmitting or receiving the sidelink relay discovery message according to the sidelink RSRP, the sidelink relay may acquire configuration information of a sidelink RSRP threshold (at least one or a combination of a minimum SL RSRP threshold and a maximum SL RSRP threshold). The sidelink relay discovery message transmitted by the sidelink relay may include at least one or a combination of service information which can be supported by the sidelink relay, target terminal information, sidelink flow information, sidelink bearer information, sidelink unicast link information, source terminal information, a sidelink relay selection condition and parameter configuration, and sidelink resource information (for example, a resource pool, a frequency, and a BWP) to be used in communication with the sidelink relay. Here, an example of the sidelink relay selection condition and parameter configuration to be applied by a terminal to discover a sidelink relay may include an SL RSRP threshold configuration when a relay is selected according to an SL RSRP measurement value.

If a configured condition is satisfied while the source terminal and the target terminal perform data transmission or reception through a sidelink direct connection (a unicast, groupcast, and broadcast schemes), determination to perform data transmission or reception through relaying of the U2U relay can be made. Additionally, if a configured condition is satisfied while the source terminal and the target terminal perform data transmission or reception through the relaying of the U2U relay (unicast, groupcast, and broadcast schemes), determination to perform data transmission or reception through a sidelink direct connection between the source terminal and the target terminal can be made.

Figure 8A:
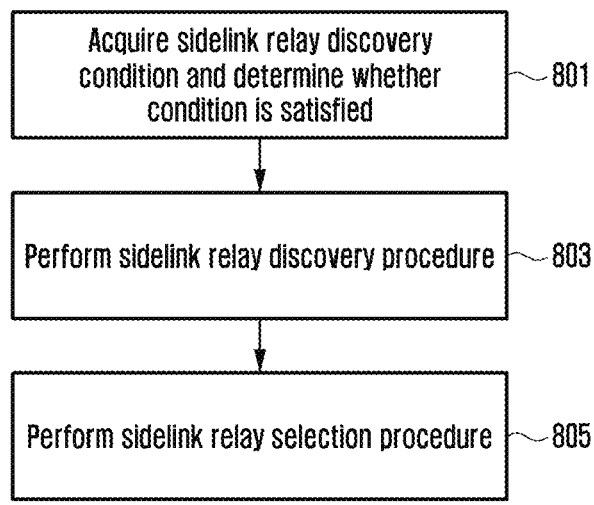
FIG. 8A illustrates an operation of a terminal which processes a sidelink relay discovery according to an embodiment of the disclosure.

FIG. 8A illustrates an operation of a terminal which processes a sidelink relay discovery according to an embodiment of the disclosure.

Referring to FIG. 8A, in operation 801, the terminal may acquire a condition to discover a sidelink relay which can relay data transmission or reception with a target terminal, and may determine whether a condition to perform a sidelink relay discovery procedure is satisfied. Configuration information for determining the sidelink relay discovery condition may include the strength of a sidelink signal (an SL RSRP measurement value) between the terminal and the target terminal and the strength of a sidelink signal (an SL RSRP measurement value) between the terminal and a sidelink relay in use or a candidate sidelink relay. Additionally, when the terminal has a direct connection (including sidelink unicast, sidelink groupcast, and sidelink broadcast) to the target terminal, the terminal may acquire and use a discovery condition configuration for each connection scheme. In operation 803, the terminal may perform the sidelink relay discovery procedure. The sidelink relay discovery procedure may correspond to a discovery solicitation message procedure in which the terminal requests transmission of a discovery message from the sidelink relay, or may correspond to a procedure in which the terminal monitors discovery message reception of the sidelink relay. When the terminal receives the discovery message from the sidelink relay in operation 803, the terminal may select the sidelink relay in operation 805. If a separate sidelink relay selection condition is configured, operation 805 may be performed. If there is no separate sidelink relay selection condition configured, the terminal may select the sidelink relay according to discovery message received in operation 803. A procedure of discovering a sidelink relay by the terminal shown in FIG. 8A is described in detail with reference to FIG. 8B.

Figure 8B:
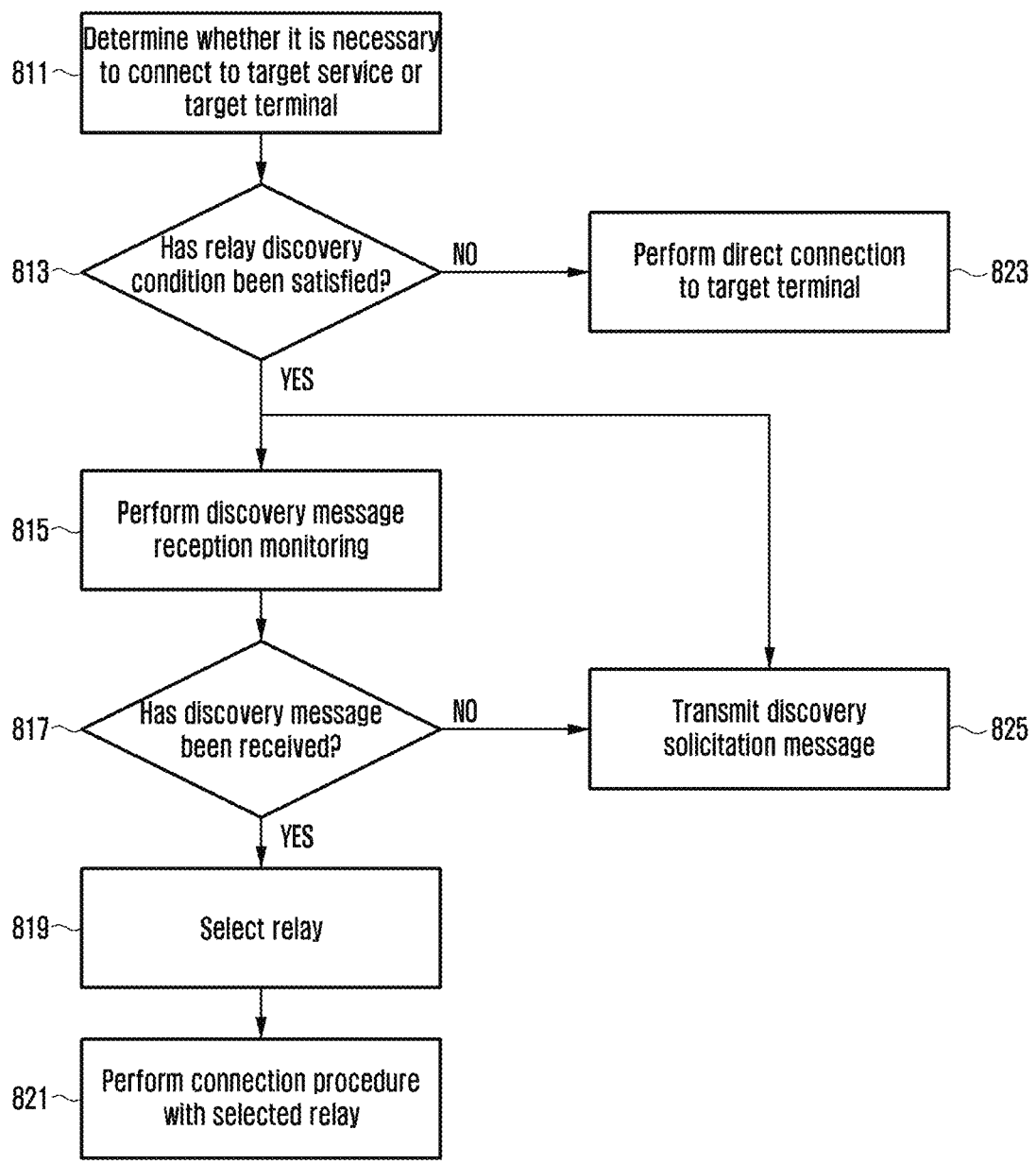
FIG. 8B illustrates an operation of a terminal which processes a sidelink relay discovery according to an embodiment of the disclosure.

FIG. 8B illustrates an operation of a terminal of processing a sidelink relay discovery according to an embodiment of the disclosure.

Referring to FIG. 8B, in operation 811, the terminal may determine whether a connection to a target terminal or a target service that the terminal can use and the terminal desires to be provided is required. The terminal may perform operation 811 above when the terminal has not configured the connection to the target service or the target terminal. In addition, operation 811 may further include an operation of determining whether to maintain a direct connection since the connection between the target and the target service or the target terminal is configured and a condition (for example, determination according to a threshold of the RSRP or determination according to a reference value of each transmission scheme (cast type)) to maintain the connection configuration satisfied, or to configure a connection to a sidelink relay since a condition to maintain a direct connection configuration is not satisfied. The terminal may determine whether a condition to perform a sidelink relay discovery operation is satisfied in operation 813. The condition to perform the sidelink relay discovery operation may include at least one or a combination of conditions in [Table 7] below.

addition to the signal strength-based sidelink relay discovery condition in [Table 7]. When the terminal performs sidelink unicast-based data transmission or reception with the counterpart terminal, the terminal may acquire at least one or a combination of an SL-RSRP measurement result value for the sidelink, HARQ feedback (ACK or NAK), the number of times of RLC retransmission in a case of applying an RLC AM mode, a packet reception ratio (PRR), and the degree of congestion of a resource pool (a channel busy ratio (CBR)). The information may be used to determine whether to transmit or receive data through a direct connection between the terminal and the counterpart terminal or to transmit or receive data through a relay service of a sidelink relay. A threshold of an SL-RSRP measurement value to be applied to the sidelink relay discovery condition, a threshold of the number of consecutive HARQ NAKs, a threshold of the number of times of retransmission, a PRR threshold, or a CBR threshold may be a value acquired from the base station, or may preconfigured for the terminal, and may be additionally configured by a PC5-RRC message (RRC reconfiguration sidelink and RRC reconfiguration complete sidelink) between the terminal and the counterpart terminal. The sidelink relay discovery condition information may be configured for each sidelink flow, configured for a sidelink unicast link, configured for a sidelink destination identifier, configured for a sidelink PQI, configured for a sidelink QoS parameter set, or configured for each sidelink bearer.

When the terminal performs sidelink groupcast-based data transmission or reception with the counterpart terminal, the terminal may acquire at least one or a combination of HARQ feedback (ACK or NAK), a packet reception ratio (PRR), a measurement result of the degree of congestion of a resource pool (a channel busy ratio (CBR)). The information may be used to determine whether to transmit or receive data through a direct connection between the terminal and the counterpart terminal or to transmit or receive data through a relay service of a sidelink relay. The relay service of the sidelink relay is used in the groupcast-based sidelink data transmission or reception in order to satisfy commination range requirements of a groupcast service flow. When it is determined that a terminal-to-terminal direct connection (groupcast) fails to satisfy the communication range requirements, the terminal may perform a sidelink relay discovery

TABLE 14

The sidelink relay discovery condition may include at least one or a combination of a condition for a terminal to monitor discovery message reception that is transmitted by a relay and a condition for the terminal to transmit a discovery solicitation message to request a discovery message from the relay. The condition for the terminal to transmit the discovery solicitation message may be applied when the terminal performs sidelink data transmission or reception with a counterpart terminal according to at least one of sidelink unicast, sidelink groupcast, and sidelink broadcast schemes.
When the terminal is in an RRC_IDLE state, an RRC_INACTIVE state, an RRC_CONNECTED state, or an OUT-OF-COVERAGE state, when there is no direct connection between the terminal and a target terminal or a terminal which capable of providing a target service, or when it is determined that a sidelink RSRP measurement result value of a direct connect to the target terminal or the terminal capable of providing the target service is smaller than a configured SL RSRP threshold, transmission of a relay discovery message transmission (e.g., discovery solicitation message) for the sidelink relay discovery may be performed.
The SL RSRP threshold may be acquired from the base station or may be preconfigured for the terminal.

In addition, a condition to determine a sidelink relay discovery by a terminal may be determined according to a sidelink communication scheme (sidelink unicast, sidelink groupcast, and sidelink broadcast) between the terminal and a counterpart terminal. The condition may be performed in procedure. The sidelink relay discovery condition information to be applied to determine whether the terminal-to-terminal direct connection satisfies the commination range requirements may include a threshold of the number of consecutive HARQ NAKs, a PRR threshold, and a CBR threshold, and may be a value acquired from the base station or preconfigured for the terminal. The sidelink relay discovery condition information may be configured for each sidelink flow, configured for a sidelink group, configured for a sidelink destination identifier, configured for a sidelink PQI, configured for a sidelink QoS parameter set, or configured for each sidelink bearer.

When the terminal performs sidelink broadcast-based data transmission or reception with the counterpart terminal, the terminal may acquire at least one or a combination of a packet reception ratio (PRR) and a measurement result of the degree of congestion of a resource pool (a channel busy ratio (CBR)). The information may be used to determine whether to transmit or receive data through a direct connection between the terminal and the counterpart terminal or to transmit or receive data through a relay service of a sidelink relay. The relay service of the sidelink relay is used in the broadcast-based sidelink data transmission or reception in order to satisfy QoS requirements of a service flow provided via broadcast. When it is determined that a terminal-to-terminal direct connection (broadcast) fails to satisfy the service QoS requirements, the terminal may perform a sidelink relay discovery procedure. The sidelink relay discovery condition information to be applied to determine whether the terminal-to-terminal direct connection satisfies the service QoS requirements may include a PRR threshold and a CBR threshold, and may be a value acquired from the base station or preconfigured for the terminal. The sidelink relay discovery condition information may be configured for each sidelink flow, configured for a sidelink destination identifier, configured for a sidelink PQI, configured for a sidelink QoS parameter set, or configured for each sidelink bearer.

If it is determined according to the determination in operation 813 that the sidelink relay discovery condition is not satisfied, the terminal may proceed to operation 823 and perform a procedure of maintaining a direct connection to the target terminal or target service, or configuring a direct connection when no direct connection is configured. The direct connection configuration procedure may depart from the scope of the disclosure, and thus detailed procedures thereof will be omitted.

If it is determined in operation 813 that the sidelink relay discovery condition is satisfied, the terminal may proceed to operation 815 and monitor discovery message reception transmitted from the relay. In operation 817, the terminal may determine that the discovery message is received from the relay. If it is determined according to the determination in operation 817 that the discovery message has been received (for example, when the discovery message is received within a configured time T1), the terminal may determine a relay selection condition in operation 819 and select a relay satisfying the relay selection condition. If the terminal determines that there is no relay satisfying the relay selection condition in operation 819, the terminal may determine that a condition to configure a direct connection to the target terminal is satisfied, and if the condition to configure a direct connection to the target terminal is satisfied, the terminal may perform a direct connection procedure with the target terminal. The terminal may perform the configuration of the direct connection to the relay selected in operation 821. The direct connection configuration operation may include a procedure defined in the NR-V2X technology. If it is determined in operation 817 that the discovery message is not received from the relay (for example, when the discovery message is not received during a configured time T1), the terminal may transmit a discovery solicitation message and request the relay to transmit the discovery message in operation 825. In addition, the terminal may determine whether the relay discovery condition in operation 813 is still satisfied before sending the discovery solicitation message. If it is determined that the relay discovery condition in operation 813 is still satisfied, the terminal may transmit the discovery solicitation message. If it is not determined that the relay discovery condition in operation 813 is satisfied, the terminal may not perform the discovery solicitation message transmission and may perform operation 823. The terminal may proceed to operation 815 and monitor the discovery message reception. In this case, the discovery message, the reception of which is monitored by the terminal, corresponds to a response message to the discovery solicitation message transmitted in operation 825. The terminal may transmit the discovery solicitation message in operation 825 and start a timer T2. The time T2 may be configured with a value same as or different from the timer T1. The terminal may proceed from operation 825 to operations 815 and 817, and may determine whether the discovery message is received within the timer T2. If the terminal determines that the discovery message is not received within the timer T2, the terminal may determine that the relay discovery procedure has failed. In another embodiment, if the terminal determines that the discovery message is not received within the timer T2, the terminal may retransmit the discovery solicitation message, and the number of times of retransmission of the discovery solicitation message may be configured for the terminal (for example, the terminal may acquire the number of times of retransmission from the relay discovery message transmission and reception configuration information in operation 653 in FIG. 6B). In this case, the terminal transmits the discovery solicitation message by the number of times of retransmission, and if it is determined that the discovery message is not received, the terminal may determine that the relay discovery procedure has failed.

FIG. 8B shows an example of a terminal operation in a case of managing both relay discovery model A and relay discovery model B. That is, the terminal may first start reception of a discovery message of relay discovery model A, and if the discovery message is not received within a predetermined time T1, the terminal may start transmission of a discovery solicitation message of relay discovery model B. In addition, the terminal may consider a case of using a system supporting both relay discovery model A and relay discovery model B, and in this case, a separate condition to select a relay discovery model by the terminal may be configured. For example, condition A to monitor reception of the discovery message of relay discovery model A may be configured. Condition B to transmit the discovery solicitation message of relay discovery model B may be configured. If it is determined that condition A is satisfied, the terminal may start the reception of the discovery message of relay discovery model A. When the terminal determines that condition B is satisfied, the terminal may start transmission of the discover solicitation message of relay discovery model B. When the terminal determines that both conditions A and B are satisfied, the terminal may randomly select a relay discovery model or may select relay discovery model A.

According to an embodiment of the disclosure, when a system supporting neither relay discovery model A nor relay discovery model B is used, information on a relay discovery model which can be used by the terminal may be acquired through relay discovery model configuration information and relay discovery model authentication information.

A scheme of additionally applying sidelink relay discovery information for each sidelink transmission scheme (unicast, groupcast, and broadcast) has been described with reference to FIG. 8B. When adding and using sidelink relay discovery information for each transmission scheme, the terminal performing the sidelink relay discovery procedure may correspond to a transmission terminal or a reception terminal, and hereinafter, an operation of performing a sidelink relay discovery procedure by a transmission terminal or a reception terminal in each of sidelink unicast, sidelink groupcast, and sidelink broadcast will be described with reference to FIGS. 9A, 9B, 9C, 10A, 10B, 10C, 11A, 11B, and 11C.

Figure 9A:
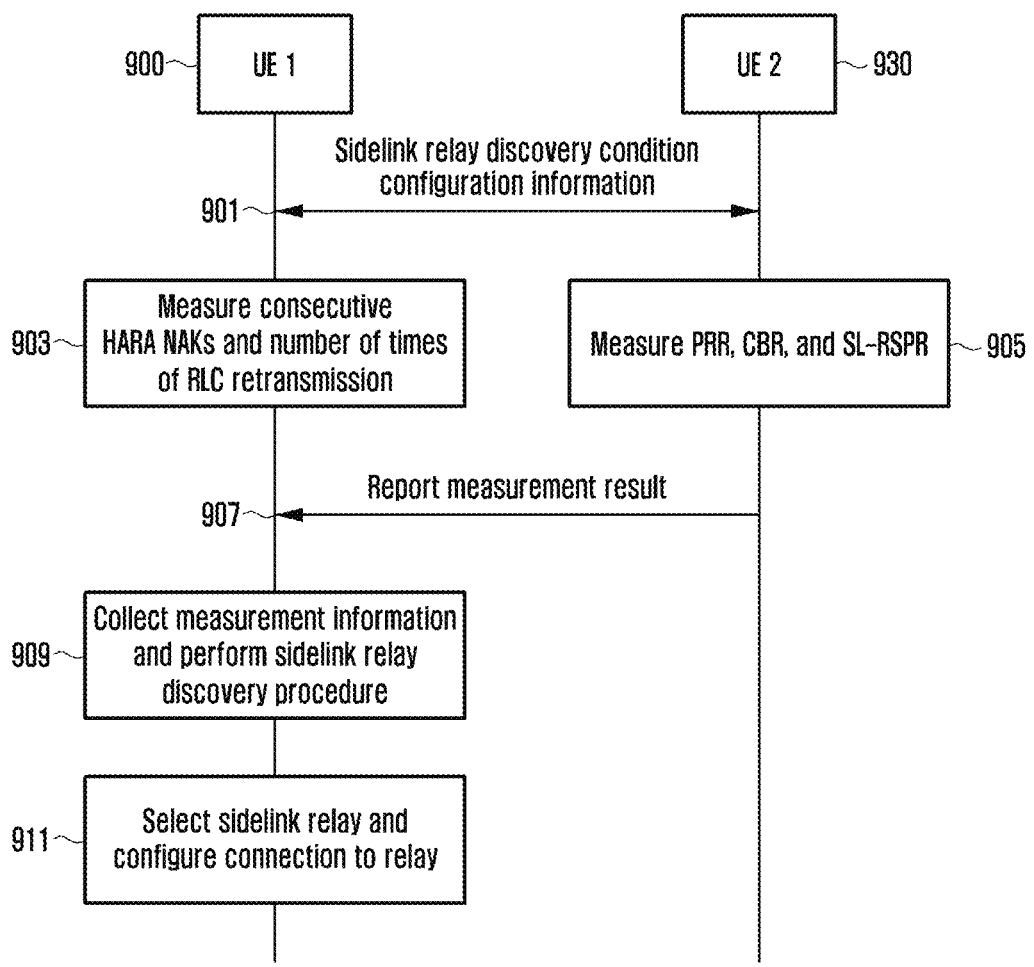
FIG. 9A illustrates an operation of a terminal performing a sidelink relay discovery procedure in sidelink unicast according to an embodiment of the disclosure.
Figure 9B:
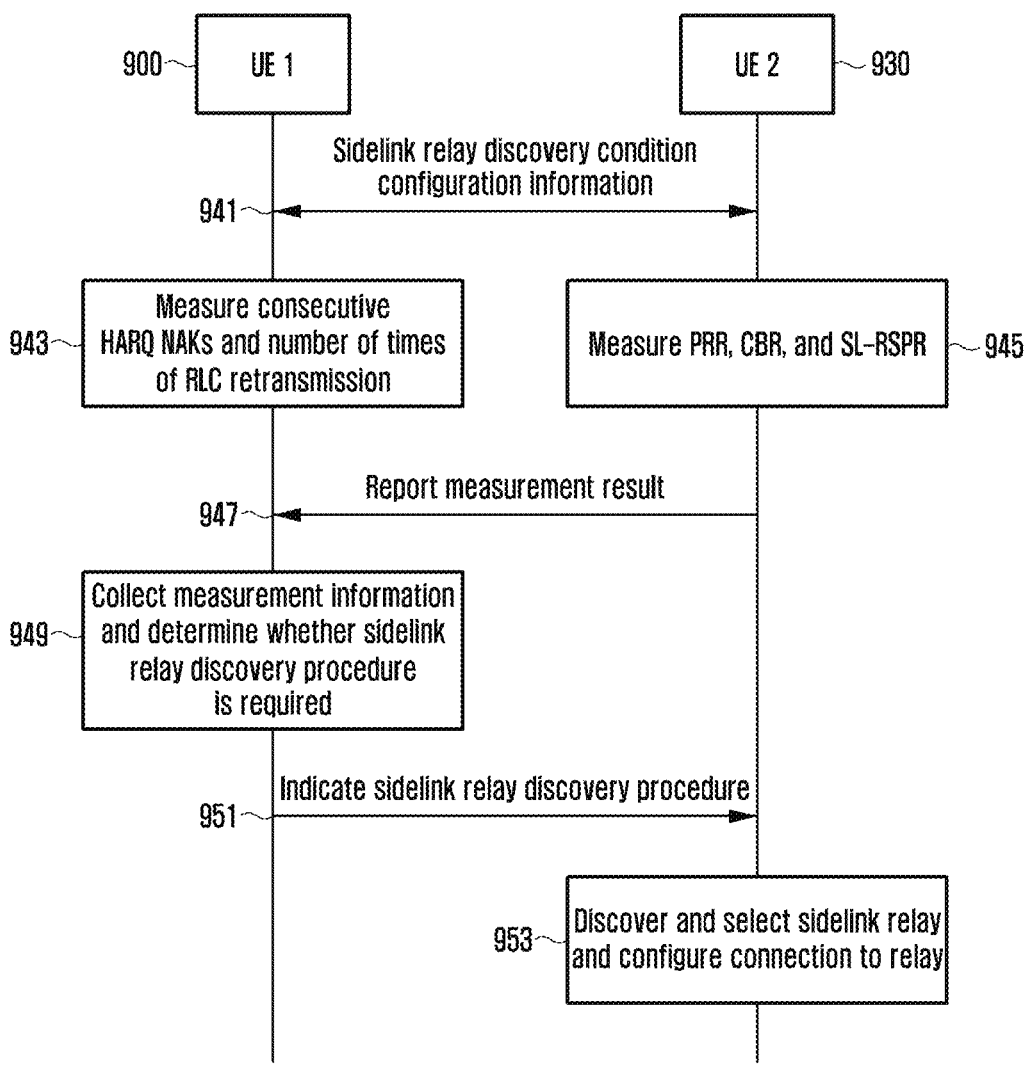
FIG. 9B illustrates an operation of a terminal performing a sidelink relay discovery procedure in sidelink unicast according to an embodiment of the disclosure.

FIG. 9A illustrates an operation of a terminal performing a sidelink relay discovery procedure in sidelink unicast according to an embodiment of the disclosure, FIG. 9B illustrates an operation of a terminal performing a sidelink relay discovery procedure in sidelink unicast according to an embodiment of the disclosure, and FIG. 9C illustrates an operation of a terminal performing a sidelink relay discovery procedure in sidelink unicast according to an embodiment of the disclosure.

In a case of the sidelink unicast, a transmission terminal may perform a sidelink relay discovery procedure (FIG. 9A), a reception terminal may perform a sidelink relay discovery procedure (FIG. 9B) upon the indication from the transmission terminal, or the reception terminal may perform the sidelink relay discovery procedure (FIG. 9C).

FIG. 9A illustrates an operation of a terminal performing a sidelink relay discovery procedure in sidelink unicast according to an embodiment of the disclosure.

Referring to FIG. 9A, in sidelink unicast communication, a UE 1 900 corresponds to a transmission terminal, and a UE 2 930 corresponds to a reception terminal. The UE 1 900 and the UE 2 930 may transmit or receive sidelink relay discovery condition configuration information in operation 901 (e.g., using an RRC reconfiguration sidelink message and an RRC reconfiguration complete sidelink message). The sidelink relay discovery condition configuration information may include a parameter to be measured and a threshold to be applied to parameters for reporting of measurement values. The measurement parameter may include, for example, SL-RSRP, CBR, PPR, consecutive HARQ NAKs, the number of times of RLC retransmission, etc. A threshold of an SL-RSRP measurement value applied to the sidelink relay discovery condition may be configured with a value determined to be more advantageous to transmit or receive data through relaying of a sidelink relay terminal compared to a direct connection between the transmission terminal 900 and the reception terminal 930. The transmission terminal 900 may transfer a measurement configuration and a report configuration to the reception terminal 930 so that the reception terminal 930 measures SL-RSRP and reports the same. A PRR threshold applied to the sidelink relay discovery condition may be configured with a value determined that transmitting or receiving data through relaying of a sidelink relay terminal increases a PRR value, compared to a direct connection between the transmission terminal 900 and the reception terminal 930. The transmission terminal 900 may transfer a measurement configuration and a report configuration to the reception terminal 930 so that the reception terminal 930 measures the PRR value and reports the same. When a CBR value is applied to the sidelink relay discovery condition, the transmission terminal 900 indicates CBR measurement to the reception terminal 930, and provide the reception terminal 930 with an SL CBR report configuration and an SL CBR measurement configuration for acquiring a CBR measurement result from the reception terminal 930.

The reception terminal 930 may perform an operation of measuring a configured parameter in operation 905, and may report the measured result value to the transmission terminal 900 in operation 907. The reception terminal 930 may report the SL-RSRP measurement value to the transmission terminal 900 according to the SL-RSRP measurement configuration and the report configuration. The reception terminal 930 may determine the PRR value according to, for example, a received PDCP sequence number. The PDCP layer of the reception terminal 930 may report the PRR measurement value to the PDCP layer of the transmission terminal 900, and the PRR measurement value may be transferred through a PDCP control PDU. For example, the PRR measurement may be determined according to a sequence number of a packet received in the upper layer of the reception terminal 930, and may be collected in the PC5-S layer. The reception terminal 930 may report the PRR measurement value to the transmission terminal 900, and the PRR measurement value may be transferred through PC5-S signaling. The reception terminal 930 may measure the CBR and transfer the CBR measurement result to the transmission terminal 900 according to the SL CBR measurement configuration and the SL CBR report configuration.

In operation 903, the number of consecutive HARQ NAKs applied to the sidelink relay discovery condition, which can be measured by the transmission terminal 900, may be configured with a value (a value smaller than the number of HARQ NAKs triggering an SL unicast radio link failure (RLF)) allowing data transmission or reception through relaying of the sidelink relay terminal without triggering of the RLF of a direct connection (unicast) between the transmission terminal 900 and the reception terminal 930. The transmission terminal 900 may measure the number of consecutive HARQ NAKs according to HARQ feedback from the reception terminal 930. The number of times of RLC retransmission, which can be measured by the transmission terminal 900 and is applied to the sidelink relay discovery condition, may be configured with a value (a value smaller than the maximum RLC retransmission triggering the SL unicast RLF) allowing data transmission or reception through relaying of the sidelink relay terminal without triggering of the RlF of a direct connection (unicast) between the transmission terminal 900 and the reception terminal 930. The transmission terminal 900 may measure the number of times of RLC retransmission according to HARQ feedback from the reception terminal 930. When a CBR value is applied to the sidelink relay discovery condition and the transmission terminal 900 is configured to measure an SL CBR, the transmission terminal 900 may measure the SL CBR according to the SL CBR measurement configuration and acquire a CBR measurement result value.

In operation 909, the transmission terminal 900 may perform the sidelink relay discovery procedure by using sidelink relay discovery information (at least one or a combination of the PRR measurement value, the SL-RSRP measurement value, and the CBR measurement value) acquired from the reception terminal 930 or sidelink relay discovery information (at least one or a combination of the number of consecutive HARQ NAKs, the number of times of RLC retransmission, and the CBR measurement value) directly acquired by the transmission terminal 900 itself. In operation 911, the transmission terminal 900 may select a sidelink relay and configure a connection to the selected sidelink relay. Thereafter, the transmission terminal 900 may perform data transmission or reception to or from the reception terminal 930 through the sidelink relay. Operations 909 to 911 performed by the transmission terminal 900 are the same as shown in FIGS. 8A and 8B.

FIG. 9B illustrates an operation of a terminal performing a sidelink relay discovery procedure in sidelink unicast according to an embodiment of the disclosure.

Referring to FIG. 9B, in sidelink unicast communication, a UE 1 900 corresponds to a transmission terminal, and a UE 2 930 corresponds to a reception terminal. The UE 1 900 and the UE 2 930 may transmit or receive sidelink relay discovery condition configuration information in operation 941 (e.g., using an RRC reconfiguration sidelink message and an RRC reconfiguration complete sidelink message). The sidelink relay discovery condition configuration information may include a parameter to be measured and a threshold to be applied to parameters for reporting of measurement values. The measurement parameter may include, for example, SL-RSRP, CBR, PPR, consecutive HARQ NAKs, the number of times of RLC retransmission, etc. A threshold of an SL-RSRP measurement value applied to the sidelink relay discovery condition may be configured with a value determined to be more advantageous to transmit or receive data through relaying of a sidelink relay terminal compared to a direct connection between the transmission terminal 900 and the reception terminal 930. The transmission terminal 900 may transfer a measurement configuration and a report configuration to the reception terminal 930 so that the reception terminal 930 measures SL-RSRP and reports the same. A PRR threshold applied to the sidelink relay discovery condition may be configured with a value determined that transmitting or receiving data through relaying of a sidelink relay terminal increases a PRR value, compared to a direct connection between the transmission terminal 900 and the reception terminal 930. The transmission terminal 900 may transfer a measurement configuration and a report configuration to the reception terminal 930 so that the reception terminal 930 measures the PRR value and reports the same. When a CBR value is applied to the sidelink relay discovery condition, the transmission terminal 900 indicates CBR measurement to the reception terminal 930, and provide the reception terminal 930 with an SL CBR report configuration and an SL CBR measurement configuration for acquiring a CBR measurement result from the reception terminal 930.

The reception terminal 930 may perform an operation of measuring a configured parameter in operation 945, and may report the measured result value to the transmission terminal 900 in operation 947. The reception terminal 930 may report the SL-RSRP measurement value to the transmission terminal 900 according to the SL-RSRP measurement configuration and the report configuration. The reception terminal 930 may determine the PRR value according to, for example, a received PDCP sequence number. The PDCP layer of the reception terminal 930 may report the PRR measurement value to the PDCP layer of the transmission terminal 900, and the PRR measurement value may be transferred through a PDCP control PDU. For example, the PRR measurement may be determined according to a sequence number of a packet received in the upper layer of the reception terminal 930, and may be collected in the PC5-S layer. The reception terminal 930 may report the PRR measurement value to the transmission terminal 900, and the PRR measurement value may be transferred through PC5-S signaling. The reception terminal 930 may measure the CBR and transfer the CBR measurement result to the transmission terminal 900 according to the SL CBR measurement configuration and the SL CBR report configuration.

In operation 943, the number of consecutive HARQ NAKs applied to the sidelink relay discovery condition, which can be measured by the transmission terminal 900, may be configured with a value (a value smaller than the number of HARQ NAKs triggering an SL unicast radio link failure (RLF)) allowing data transmission or reception through relaying of the sidelink relay terminal without triggering of the RIF of a direct connection (unicast) between the transmission terminal 900 and the reception terminal 930. The transmission terminal 900 may measure the number of consecutive HARQ NAKs according to HARQ feedback from the reception terminal 930. The number of times of RLC retransmission, which can be measured by the transmission terminal 900 and is applied to the sidelink relay discovery condition, may be configured with a value (a value smaller than the maximum RLC retransmission triggering the SL unicast RLF) allowing data transmission or reception through relaying of the sidelink relay terminal without triggering of the RLF of a direct connection (unicast) between the transmission terminal 900 and the reception terminal 930. The transmission terminal 900 may measure the number of times of RLC retransmission according to HARQ feedback from the reception terminal 930. When a CBR value is applied to the sidelink relay discovery condition and the transmission terminal 900 is configured to measure an SL CBR, the transmission terminal 900 may measure the SL CBR according to the SL CBR measurement configuration and acquire a CBR measurement result value.

In operation 949, the transmission terminal 900 may determine whether to perform the sidelink relay discovery procedure by using sidelink relay discovery information (at least one or a combination of the PRR measurement value, the SL-RSRP measurement value, and the CBR measurement value) acquired from the reception terminal 930 or sidelink relay discovery information (at least one or a combination of the number of consecutive HARQ NAKs, the number of times of RLC retransmission, and the CBR measurement value) directly acquired by the transmission terminal 900 itself. When the transmission terminal 900 determines to perform sidelink relay discovery in operation 949, the transmission terminal 900 may transmit a message indicating to start the sidelink relay discovery procedure to the reception terminal 930 in operation 951 (e.g., an RRC reconfiguration sidelink message may be used). In operation 953, the reception terminal 930 received the indication from the transmission terminal 900 may perform the sidelink relay discovery procedure, select a relay, and perform a connection configuration procedure with the selected sidelink relay. The sidelink relay discovery procedure performed by the reception terminal 930 in operation 953 may include an operation in which the reception terminal 930 performs relay discovery message (e.g., discovery solicitation message) transmission or the reception terminal 930 monitors discovery message reception of the relay, as shown in FIGS. 8A and 8B.

FIG. 9C illustrates an operation of a terminal performing a sidelink relay discovery procedure in sidelink unicast according to an embodiment of the disclosure.

Referring to FIG. 9C, in sidelink unicast communication, a UE 1 900 corresponds to a transmission terminal, and a UE 2 930 corresponds to a reception terminal. The UE 1 900 and the UE 2 930 may transmit or receive sidelink relay discovery condition configuration information in operation 971 (e.g., using an RRC reconfiguration sidelink message and an RRC reconfiguration complete sidelink message). The sidelink relay discovery condition configuration information may include a parameter to be measured and a threshold to be applied to parameters for reporting of measurement values. The measurement parameter may include, for example, SL-RSRP, CBR, PPR, consecutive HARQ NAKs, the number of times of RLC retransmission, etc. A threshold of an SL-RSRP measurement value applied to the sidelink relay discovery condition may be configured with a value determined to be more advantageous to transmit or receive data through relaying of a sidelink relay terminal compared to a direct connection between the transmission terminal 900 and the reception terminal 930. The transmission terminal 900 may transfer a measurement configuration so that the reception terminal 930 measures SL-RSRP. The transmission terminal 900 may transfer a measurement configuration to the reception terminal 930 so that the reception terminal 930 measures the PRR value. A PRR threshold applied to the sidelink relay discovery condition may be configured with a value determined that transmitting or receiving data through relaying of a sidelink relay terminal increases a PRR value, compared to a direct connection between the transmission terminal 900 and the reception terminal 930. The transmission terminal 900 may transfer a measurement configuration to the reception terminal 930 so that the reception terminal 930 measures SL-RSRP. When a CBR value is applied to the sidelink relay discovery condition, the transmission terminal 900 may provide the reception terminal 930 with an SL CBR measurement configuration for indicating the CBR measurement to the reception terminal 930.

The reception terminal 930 may perform an operation of measuring a configured parameter in operation 975, and obtain the measured result value. The reception terminal 930 may obtain the SL-RSRP measurement value according to the SL-RSRP measurement configuration. The reception terminal 930 may determine the PRR value according to, for example, a received PDCP sequence number. For example, the PRR measurement may be determined according to a sequence number of a packet received in the upper layer of the reception terminal 930, and may be collected in the PC5-S layer. The reception terminal 930 may obtain the CBR measurement result value according to the SL CBR measurement configuration.

In operation 973, the number of consecutive HARQ NAKs applied to the sidelink relay discovery condition, which can be measured by the transmission terminal 900, may be configured with a value (a value smaller than the number of HARQ NAKs triggering an SL unicast radio link failure (RLF)) allowing data transmission or reception through relaying of the sidelink relay terminal without triggering of the RLF of a direct connection (unicast) between the transmission terminal 900 and the reception terminal 930. The transmission terminal 900 may measure the number of consecutive HARQ NAKs according to HARQ feedback from the reception terminal 930. The number of times of RLC retransmission, which can be measured by the transmission terminal 900 and is applied to the sidelink relay discovery condition, may be configured with a value (a value smaller than the maximum RLC retransmission triggering the SL unicast RLF) allowing data transmission or reception through relaying of the sidelink relay terminal without triggering of the RLF of a direct connection (unicast) between the transmission terminal 900 and the reception terminal 930. The transmission terminal 900 may measure the number of times of RLC retransmission according to HARQ feedback from the reception terminal 930. When a CBR value is applied to the sidelink relay discovery condition and the transmission terminal 900 is configured to measure an SL CBR, the transmission terminal 900 may measure the SL CBR according to the SL CBR measurement configuration and acquire a CBR measurement result value. In operation 977, the transmission terminal 900 may report, to the reception terminal 930, the measured number of consecutive HARQ NAKs, the measured number of times of RLC retransmission, and the measured CBR result value. In operation 979, the reception terminal 930 may perform the sidelink relay discovery procedure by using sidelink relay discovery information (at least one or a combination of the number of consecutive HARQ NAKs, the number of times of RLC retransmission, and the CBR measurement value) acquired from the transmission terminal 900 or sidelink relay discovery information (at least one or a combination of the PRR measurement value, the SL-RSRP measurement value, and the CBR measurement value) directly acquired by the reception terminal 930 itself. In operation 981, the reception terminal 930 may select a sidelink relay and configure a connection to the selected sidelink relay. Thereafter, the reception terminal 930 may perform data transmission or reception to or from the transmission terminal 900 through the sidelink relay. Operations 979 to 981 performed by the reception terminal 930 are the same as shown in FIGS. 8A and 8B.

Figure 10A:
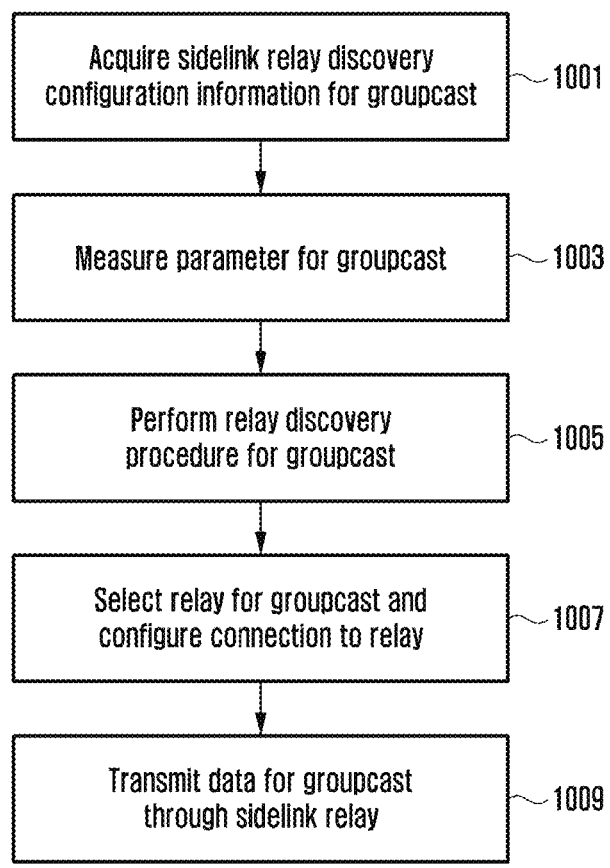
FIG. 10A illustrates an operation of a terminal performing a sidelink relay discovery procedure in sidelink groupcast according to an embodiment of the disclosure.
Figure 10B:
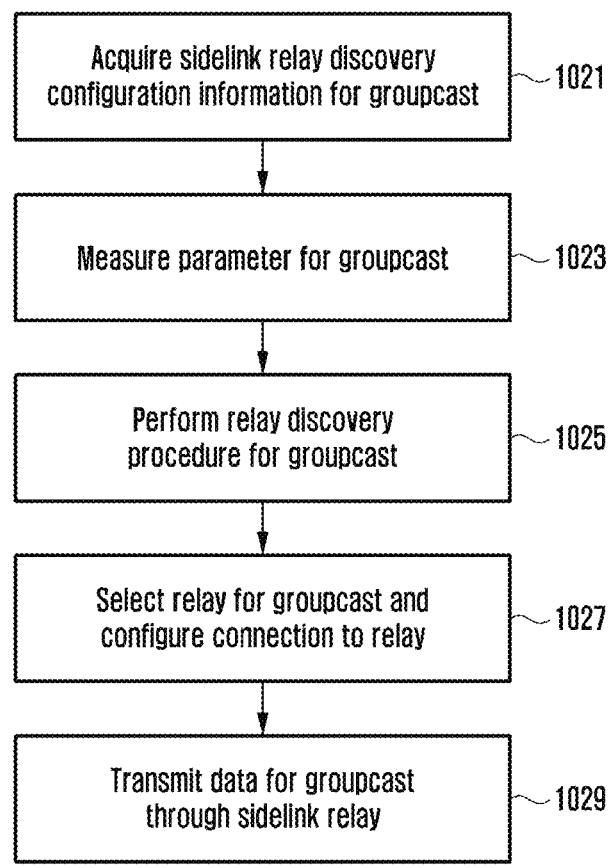
FIG. 10B illustrates an operation of a terminal performing a sidelink relay discovery procedure in sidelink groupcast according to an embodiment of the disclosure.
Figure 10C:
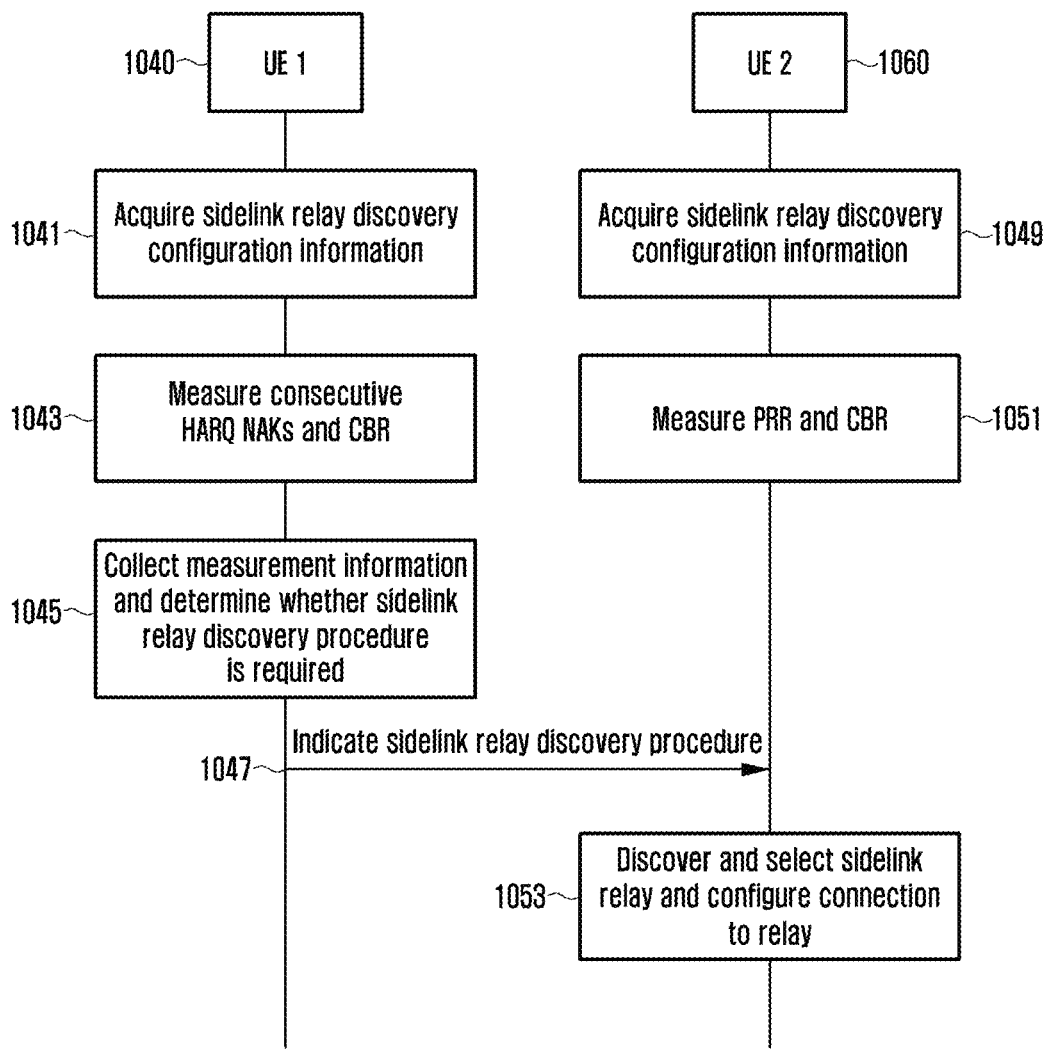
FIG. 10C illustrates an operation of a terminal performing a sidelink relay discovery procedure in sidelink groupcast according to an embodiment of the disclosure.

FIG. 10A illustrates an operation of a terminal performing a sidelink relay discovery procedure in sidelink groupcast according to an embodiment of the disclosure, FIG. 10B illustrates an operation of a terminal performing a sidelink relay discovery procedure in sidelink groupcast according to an embodiment of the disclosure, and FIG. 10C illustrates an operation of a terminal performing a sidelink relay discovery procedure in sidelink groupcast according to an embodiment of the disclosure.

A group of transmission terminals and a group of reception terminals which can use sidelink groupcast-based data transmission and reception may perform the sidelink relay discovery procedure described in FIGS. 8A and 8B. Since there is no PC5 RRC-based connection between a transmission terminal and a reception terminal performing sidelink groupcast, a condition to determine to perform the sidelink relay discovery procedure by the transmission terminal and a condition to determine to perform the sidelink relay discovery procedure by the reception terminal may be defined, and the transmission terminal and the reception terminal may perform the sidelink relay discovery procedure according to the configured conditions. A wireless communication system may determine, as a reference to determine data transmission or reception through a sidelink relay or a direct connection between the transmission terminal and the reception terminal in the groupcast, whether a QoS parameter set, a PQI, a communication range, and the like, which are required in a service in the corresponding group, are satisfied. A condition parameter to perform a sidelink relay discovery and select a sidelink relay and a threshold of the condition parameter may be configured with a value which can satisfies the QoS parameter set, the PQI, and the communication range of the group service. The transmission terminal and the reception terminal may acquire configuration information including a parameter to be used to perform the sidelink relay discovery and select the sidelink relay and a threshold of the parameter, from the base station, or may acquire information preconfigured for the terminals.

FIG. 10A illustrates an operation of a terminal performing a sidelink relay discovery procedure in sidelink groupcast according to an embodiment of the disclosure.

Referring to FIG. 10A, in operation 1001, the transmission terminal may acquire configuration information including a condition parameter used to discover a sidelink relay for the groupcast and select a relay and a threshold of the condition parameter. In operation 1003, the transmission terminal may measure at least one or a combination of the number of times of consecutive HARQ NAKs and a CBR for the corresponding groupcast. In operation 1005, the transmission terminal may perform the sidelink relay discovery procedure for the corresponding groupcast. For example, in operation 1005, the transmission terminal may compare the configured threshold of the number of times of consecutive HARQ NAKs with the measured number of times of consecutive HARQ NAKs, or may compare a CBR threshold configured for the corresponding groupcast with the measured CBR measurement value. In operation 1007, the transmission terminal may select a sidelink relay according to the sidelink relay discovery result, and configure a connection to the sidelink relay. In operations 1005 to 1007, the transmission terminal may perform the procedure in FIGS. 8A and 8B. In operation 1009, the transmission terminal may perform data transmission for the corresponding groupcast through the connected sidelink relay.

FIG. 10B illustrates an operation of a terminal performing a sidelink relay discovery procedure in sidelink groupcast according to an embodiment of the disclosure.

Referring to FIG. 10B, in operation 1021, the reception terminal may acquire configuration information including a condition parameter used to discover a sidelink relay for the groupcast and select a relay and a threshold of the condition parameter. In operation 1023, the reception terminal may measure at least one or a combination of a packet reception ratio (PRR) measurement value and a CBR measurement value for the corresponding groupcast. In operation 1025, the reception terminal may perform the sidelink relay discovery procedure for the corresponding groupcast. For example, in operation 1025, the reception terminal may compare the configured threshold of the PRR with the measured PRR value, or may compare a CBR threshold configured for the corresponding groupcast with the measured CBR measurement value. In operation 1027, the reception terminal may select a sidelink relay according to the sidelink relay discovery result, and configure a connection to the sidelink relay. In operations 1025 to 1027, the reception terminal may perform the procedure in FIGS. 8A and 8B. In operation 1029, the reception terminal may perform data reception for the corresponding groupcast through the connected sidelink relay.

In addition, when the transmission terminal determines that a sidelink relay discovery is required while the groupcast data transmission is performed, the transmission terminal may indicate the reception terminal receiving groupcast data to perform a sidelink relay discovery procedure. The reception terminal may determine to perform the sidelink relay discovery procedure which can relay groupcast data transmission or reception, in consideration of both sidelink relay discovery indication information received from the transmission terminal and a sidelink relay discovery condition configured for the reception terminal.

FIG. 10C illustrates an operation of a terminal performing a sidelink relay discovery procedure in sidelink groupcast according to an embodiment of the disclosure.

Referring to FIG. 10C, in operation 1041, a transmission terminal (a UE 1) 1040 may acquire configuration information including a condition parameter used to discover a sidelink relay for the groupcast and select a relay and a threshold of the condition parameter. In operation 1043, the UE 1 1040 may measure at least one or a combination of the number of times of consecutive HARQ NAKs and a CBR for the corresponding groupcast. In operation 1405, the UE 1 1040 may collect parameter measurement information for the sidelink relay discovery for the corresponding groupcast to determine the necessity of a sidelink relay discovery procedure. For example, in operation 1045, the UE 1 1040 may compare a configured threshold of the number of times of consecutive HARQ NAKs with the measured number of times of consecutive HARQ NAKs, or may compare a CBR threshold configured for the corresponding groupcast with the measured CBR measurement value. If the UE 1 1040 determines in operation 1045 that the sidelink relay discovery is required, the UE 1 1040 may transmit sidelink relay discovery indication to the reception terminal of the groupcast in operation 1047. In a case of the groupcast, there is no PC5-RRC connection configuration between the transmission terminal and the reception terminal, and thus the sidelink relay discovery indication signaling in operation 1047 may be transferred through at least one of SCI, a MAC CE, a MAC header, a MAC PDU, an RLC header, a PDCP header, a PDCP control PDU, and PC5-S signaling, which correspond to the groupcast transmitted by the transmission terminal. In operation 1049, a reception terminal (a UE 2) 1060 may acquire configuration information including a condition parameter used to discover a sidelink relay for the groupcast and select a relay and a threshold of the condition parameter. In operation 1051, the UE 2 1060 may measure at least one or a combination of a packet reception ratio (PRR) measurement value and a CBR measurement value for the corresponding groupcast. The UE 2 1060 may receive sidelink relay discovery indication transmitted by the UE 1 1040 in operation 1047. The sidelink relay discovery indication signaling may be acquired through at least one of SCI, a MAC CE, a MAC header, a MAC PDU, an RLC header, a PDCP header, a PDCP control PDU, and PC5-S signaling, which correspond to the groupcast transmitted by the transmission terminal. In operation 1053, the UE 2 1060 may perform a sidelink relay discovery procedure for the corresponding groupcast. For example, in operation 1053, the reception terminal may compare the configured threshold of the PRR with the measured PRR value, or may compare a CBR threshold configured for the corresponding groupcast with the measured CBR measurement value. In operation 1053, the reception terminal may select a sidelink relay according to the sidelink relay discovery result and configure a connection to the sidelink relay. In operation 1053, the reception terminal may perform the procedure in FIGS. 8A and 8B. In operation 1053, the reception terminal may perform data reception for the corresponding groupcast through the connected sidelink relay.

Figure 11A:
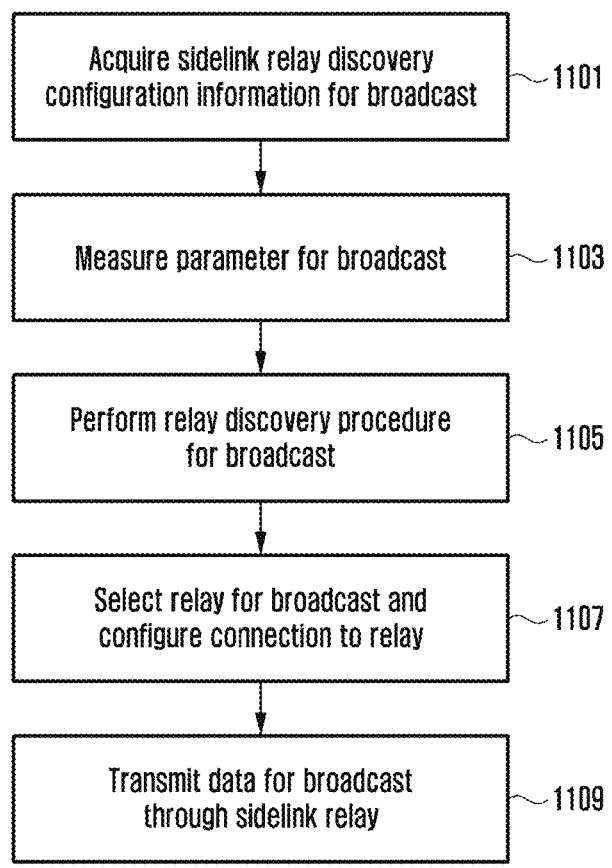
FIG. 11A illustrates an operation of a terminal performing a sidelink relay discovery procedure in sidelink broadcast according to an embodiment of the disclosure.
Figure 11B:
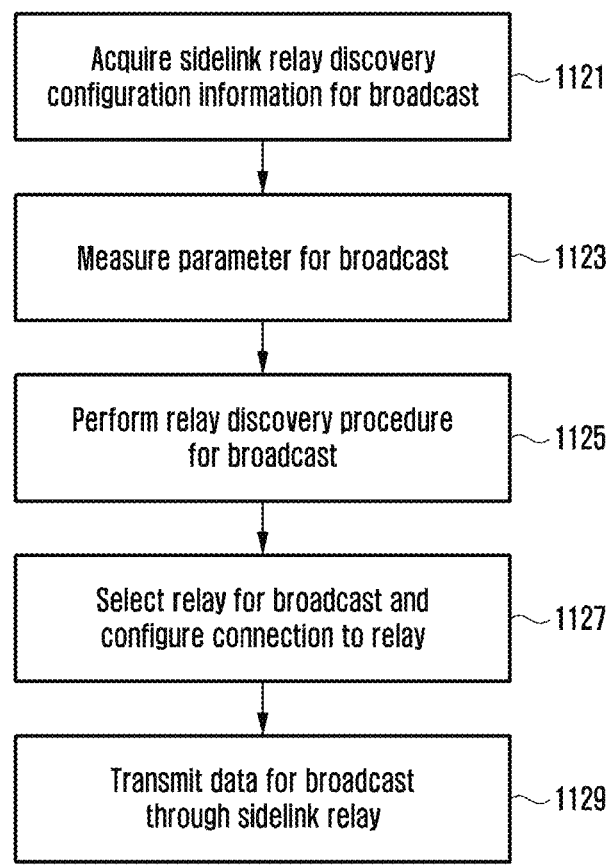
FIG. 11B illustrates an operation of a terminal performing a sidelink relay discovery procedure in sidelink broadcast according to an embodiment of the disclosure.
Figure 11C:
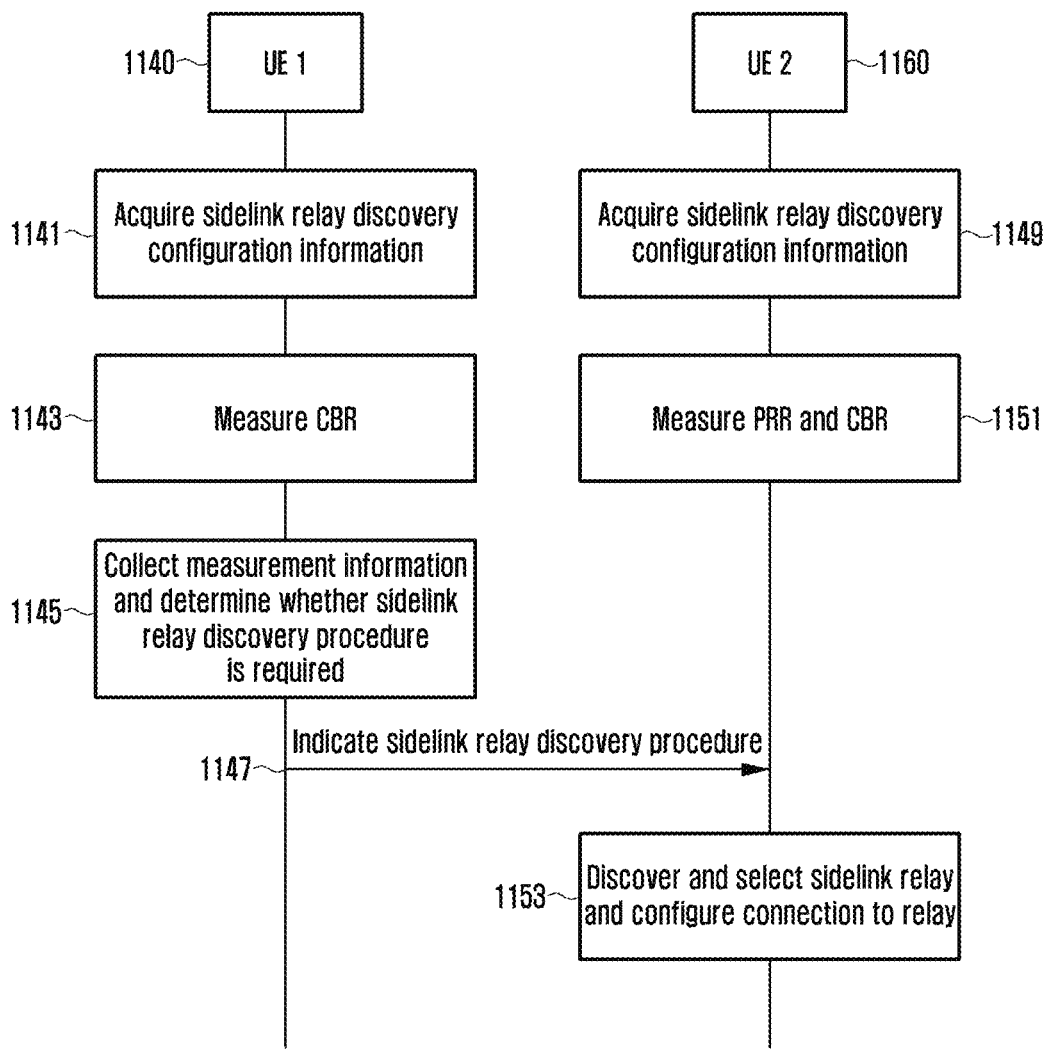
FIG. 11C illustrates an operation of a terminal performing a sidelink relay discovery procedure in sidelink broadcast according to an embodiment of the disclosure.

FIG. 11A illustrates an operation of a terminal performing a sidelink relay discovery procedure in sidelink broadcast according to an embodiment of the disclosure, FIG. 11B illustrates an operation of a terminal performing a sidelink relay discovery procedure in sidelink broadcast according to an embodiment of the disclosure, and FIG. 11C illustrates an operation of a terminal performing a sidelink relay discovery procedure in sidelink broadcast according to an embodiment of the disclosure.

A transmission terminal and a reception terminal which can use sidelink broadcast-based data transmission and reception may perform the sidelink relay discovery procedure described in FIGS. 8A and 8B. There is no PC5 RRC-based connection between the transmission terminal and the reception terminal performing sidelink broadcast, and thus a condition to determine to perform the sidelink relay discovery procedure by the transmission terminal and a condition to determine to perform the sidelink relay discovery procedure by the reception terminal may be defined, and the transmission terminal and the reception terminal may perform the sidelink relay discovery procedure according to the configured conditions.

FIG. 11A illustrates an operation of a terminal performing a sidelink relay discovery procedure in sidelink broadcast according to an embodiment of the disclosure.

Referring to FIG. 11A, in operation 1101, the transmission terminal may acquire configuration information including a condition parameter used to discover a sidelink relay for the broadcast and select a relay and a threshold of the condition parameter. In operation 1103, the transmission terminal may measure a CBR for the corresponding broadcast. In operation 1105, the transmission terminal may perform the sidelink relay discovery procedure for the corresponding broadcast. For example, in operation 1105, the transmission terminal may compare the CBR threshold configured for the corresponding broadcast with the measured CBR measurement value. In operation 1107, the transmission terminal may select a sidelink relay according to the sidelink relay discovery result, and configure a connection to the sidelink relay. In operations 1105 to 1107, the transmission terminal may perform the procedure in FIGS. 8A and 8B. In operation 1109, the transmission terminal may perform data transmission for the corresponding broadcast through the connected sidelink relay.

FIG. 11B illustrates an operation of a terminal performing a sidelink relay discovery procedure in sidelink broadcast according to an embodiment of the disclosure.

Referring to FIG. 11B, in operation 1121, the reception terminal may acquire configuration information including a condition parameter used to discover a sidelink relay for the broadcast and select a relay and a threshold of the condition parameter. In operation 1123, the reception terminal may measure at least one or a combination of a packet reception ratio (PRR) measurement value and a CBR measurement value for the corresponding broadcast. In operation 1125, the reception terminal may perform the sidelink relay discovery procedure for the corresponding broadcast. For example, in operation 1125, the reception terminal may compare the threshold of the PRR configured for the corresponding broadcast with the measured PRR value, or may compare a CBR threshold configured for the corresponding broadcast with the measured CBR measurement value. In operation 1127, the reception terminal may select a sidelink relay according to the sidelink relay discovery result, and configure a connection to the sidelink relay. In operations 1125 to 1127, the reception terminal may perform the procedure in FIGS. 8A and 8B. In operation 1129, the reception terminal may perform data reception for the corresponding broadcast through the connected sidelink relay.

In addition, when the transmission terminal determines that a sidelink relay discovery is required while the broadcast data transmission is performed, the transmission terminal may indicate the reception terminal receiving broadcast data to perform a sidelink relay discovery procedure. The reception terminal may determine to perform the sidelink relay discovery procedure which can relay broadcast data transmission or reception, in consideration of both sidelink relay discovery indication information received from the transmission terminal and a sidelink relay discovery condition configured for the reception terminal.

FIG. 11C illustrates an operation of a terminal performing a sidelink relay discovery procedure in sidelink groupcast according to an embodiment of the disclosure.

Referring to FIG. 11C, in operation 1141, a transmission terminal (a UE 1) 1140 may acquire configuration information including a condition parameter used to discover a sidelink relay for the broadcast and select a relay and a threshold of the condition parameter. In operation 1143, the UE 1 1140 may measure a CBR for the corresponding broadcast. In operation 1145, the UE 1 1140 may collect parameter measurement information for the sidelink relay discovery for the corresponding broadcast to determine the necessity of a sidelink relay discovery procedure. For example, in operation 1145, the UE 1 1140 may compare the CBR threshold configured for the corresponding broadcast with the measured CBR measurement value. If the UE 1 1140 determines in operation 1145 that the sidelink relay discovery is required, the UE 1 1140 may transmit sidelink relay discovery indication to the reception terminal of the broadcast in operation 1147. In a case of the broadcast, there is no PC5-RRC connection configuration between the transmission terminal and the reception terminal, and thus the sidelink relay discovery indication signaling in operation 1147 may be transferred through at least one of SCI, a MAC CE, a MAC header, a MAC PDU, an RLC header, a PDCP header, a PDCP control PDU, and PC5-S signaling, which correspond to the broadcast transmitted by the transmission terminal. In operation 1149, a reception terminal (a UE 2) 1160 may acquire configuration information including a condition parameter used to discover a sidelink relay for the broadcast and select a relay and a threshold of the condition parameter. In operation 1151, the UE 2 1160 may measure at least one or a combination of a packet reception ratio (PRR) measurement value and a CBR measurement value for the corresponding broadcast. The UE 2 1160 may receive sidelink relay discovery indication transmitted by the UE 1 1140 in operation 1147. The sidelink relay discovery indication signaling may be acquired through at least one of SCI, a MAC CE, a MAC header, a MAC PDU, an RLC header, a PDCP header, a PDCP control PDU, and PC5-S signaling, which correspond to the broadcast transmitted by the transmission terminal. In operation 1153, the UE 2 1160 may perform a sidelink relay discovery procedure for the corresponding broadcast. For example, in operation 1153, the reception terminal may compare the threshold of the PRR configured for the corresponding broadcast with the measured PRR value, or may compare a CBR threshold configured for the corresponding groupcast with the measured CBR measurement value. In operation 1153, the reception terminal may select a sidelink relay according to the sidelink relay discovery result and configure a connection to the sidelink relay. In operation 1153, the reception terminal may perform the procedure in FIGS. 8A and 8B. In operation 1153, the reception terminal may perform data reception for the corresponding broadcast through the connected sidelink relay.

In FIGS. 9A, 9B, 9C, 10A, 10B, 10C, 11A, 11B, and 11C, a case of performing data transmission or reception through a sidelink relay during data transmission or reception through a direct connection between terminals is illustrated. Even in a case of performing data transmission or reception through a direct connection between terminal during data transmission or reception through a sidelink relay by the terminals, parameter (the number of consecutive HARQ NAKs, the number of times of RLC retransmission, the CBR, the PRR, and the SL-RSRP) configuration information and measurement information for each sidelink transmission scheme (unicast, groupcast, and broadcast) described in FIGS. 9A, 9B, 9C, 10A, 10B, 10C, 11A, 11B, and 11C may be applied to a link between a terminal and a sidelink relay. For the link between the terminal and the sidelink relay, the terminal may perform an operation of switching an indirect connection through the relay into a direct connection with a counterpart terminal by comparing a measurement value of parameter information with threshold configured for the parameter information.

According to an embodiment, in a communication system managing a U2N relay, a service cell base station may not be able to provide a sidelink function and a sidelink relay function. In this case, a terminal may operate as an out-of-coverage terminal and discover a U2N relay or perform data transmission or reception with a base station/network through the U2N relay. Relay discovery message transmission and reception configuration information which can be used to discover a relay by a terminal may be preconfigured for the terminal. Sidelink resource pool information used to transmit or receive a relay discovery message may be preconfigured for the terminal. Configuration information (see FIGS. 6A and 6B) of a sidelink signaling bearer for transmitting a relay discovery message is configured as default configuration as shown in [Table 2] or [Table 3] and may be acquired by the terminal. Alternatively, the configuration information of the sidelink signaling bearer for transmitting the relay discovery message may be acquired from the pre-configuration that is preconfigured for the terminal.

When the terminal is in an RRC_CONNECTED state, an RRC_IDLE state, or an RRC_INACTIVE state, configuration information which can be used in a relay discovery operation may include at least one or a combination of pieces of information in [Table 8] below. The configuration information may be acquired through an SIB message or a dedicated RRC message of the base station.

TABLE 15

RSRP threshold for relay discovery, RSRP threshold for relay selection, RSRP threshold for relay reselection, RSRP threshold for path switch (direct <-> indirect)
Threshold for Uu
Threshold for Sidelink
CBR threshold for relay discovery, CBR threshold for relay selection, CBRthreshold for relay reselection, CBR threshold for path switch (direct <-> indirect)
Threshold for sidelink
Frequency, carrier, BWP, resource pool
Configuration information to be applied to resource selection when terminal directly schedules sidelink resource
Configuration information necessary to process base station scheduling when base station schedules sidelink resource (applicable only when terminal is in RRC_CONNECTED state)

When the terminal is in the out of coverage (when terminal is in a carrier supporting sidelink direct communication or sidelink relay communication) and performs data transmission or reception with the base station through the sidelink relay, a method of acquiring configuration information which can be used in the relay discovery operation by the terminal may include the following methods.

(1) The terminal is an out-of-coverage terminal regardless of a connection to the base station/network, and thus a relay discovery message may be transmitted or received using the preconfigured relay discovery configuration information.

(2) The terminal is connected to the base station/network through a relay, and thus an RRC connection state of the terminal may be determined in the same manner as an RRC connection state of the relay. For example, when the relay is connected to the RRC_CONNECTED state, the terminal may determine the RRC_CONNECTED state and use a relay discovery message transmission or reception configuration procedure configured to be used in the RRC_CONNECTED state. For example, when the relay is in an RRC_IDLE state, the terminal determines the RRC_IDLE state and use a relay discovery message transmission or reception configuration procedure configured to be used in the RRC_IDLE state. For example, when the relay is in an RRC_INACTIVE state, the terminal determines the RRC_INACTIVE state and use a relay discovery message transmission or reception configuration procedure configured to be used in the RRC_INACTIVE state.

According to an embodiment of the disclosure, when the terminal is connected to the base station/network through the sidelink relay and is in the RRC_IDLE state or the RRC_INACTIVE state, the terminal may receive at least one or a combination of system information and a paging message from the relay, and may perform an operation in the RRC_IDLE state or the RRC_INACTIVE state according to the system information and the paging message.

According to an embodiment, when the terminal is connected to the base station/network through the sidelink relay and is in the RRC_CONNECTED state, the terminal may perform an operation in the RRC_CONNECTED state.

A path switch may include a case in which a direct connection between a terminal and a base station through a Uu interface switches to an indirect connection between the terminal and the base station/network through a sidelink relay, or a case in which the indirect connection between the terminal and the base station/network through the sidelink relay switches to the direct connection between the terminal and the base station through the Uu interface.

According to an embodiment, a condition used when the terminal performs a path switch procedure may include at least one or a combination of conditions in [Table 9] below.

TABLE 16

RSRP threshold(s) for sidelink
RSRP threshold(s) for Uu interface
Channel busy ratio (CBR) threshold(s) for sidelink
Configurable with RSRP threshold or CBR threshold triggering path switch
Configurable with RSRP threshold or CBR threshold restricting frequent path switch
A threshold to keep current path
A threshold to change to other paths
Time to trigger (This may be configured for each of CBR and RSRP, and is used to determine whether CBR measurement value and RSRP measurement value are valid for path switch condition.)

As an example of an operation of a terminal according to a path switch configuration condition in [Table 9], when the terminal determines that at least one or a combination of the configuration conditions in [Table 9] is satisfied while the terminal is connected to the sidelink relay and performs data transmission or reception with the base station/network, the terminal may trigger a path switch for a direct connection to the base station. In another example, when the terminal determines that at least one or a combination of the configuration conditions in [Table 9] is satisfied while the terminal is in a direct connection to the base station and performs data transmission or reception, the terminal may trigger a path switch for a sidelink relay connection. For example, in the sidelink relay connection, a condition to trigger a path switch for the direct connection to the base station is as at least one or a combination of conditions below.

It may be determined that the path switch has been triggered since an RSRP value for a link with the sidelink relay becomes smaller than an RSRP threshold, it may be determined that the path switch has been triggered since the RSRP value for the link with the sidelink relay becomes smaller than RSRP threshold_sidelink and the RSRP value for the link with the base station becomes larger than RSRP threshold_uulink, it may be determined that the path switch has been triggered since the RSRP value for the link with the sidelink relay becomes smaller than RSRP threshold_sidelink by delta_sidelink and the RSRP value for the link with the base station becomes larger than RSRP threshold_uulink by delta_uulink, it may be determined that the path switch has been triggered since a CBR measurement result for a sidelink resource pool that is being used in communication with the sidelink relay becomes larger than CBR_threshold (on the assumption that the larger the CBR value, the higher the congestion), or it may be determined that the path switch has been triggered since the CBR measurement result for the sidelink resource pool that is being used in communication with the sidelink relay becomes larger than CBR_threshold by delta_cbr. The terminal may acquire configuration information so as to apply a time-to-trigger to each of the RSRP measurement value and the CBR measurement value, and may determine that the path switch condition is valid when the configuration condition for the RSRP measurement value is satisfied during the time-to-trigger or the configuration condition for the CBR measurement value is satisfied during the time-to-trigger.

For example, in the direct connection to the base station, a condition to trigger a path switch for sidelink relay connection is as at least one or a combination of conditions below.

It may be determined that the path switch has been triggered since the RSRP value for the link with the base station becomes smaller than the RSRP threshold, it may be determined that the path switch has been triggered since the RSRP value for the link with the base station becomes smaller than RSRP threshold by delta_uulink, it may be determined that the path switch has been triggered since the RSRP value for the link with the base station becomes smaller than RSRP_threshold_uulink and the RSRP value for the link with the sidelink relay becomes larger than RSRP threshold_sidelink, it may be determined that the path switch has been triggered since the RSRP value of the link with the base station becomes smaller than RSRP threshold_uulink by delta_uulink and the RSRP value for the link with the sidelink relay becomes larger than RSRP threshold_sidelink by delta_sidelink, it may be determined that the path switch has been triggered since the CBR measurement result for the sidelink resource pool is smaller than CBR_threshold (on the assumption that the larger the CBR value, the higher the congestion), or it may be determined that the path switch has been triggered since the CBR measurement result for the sidelink resource pool becomes smaller than CBR_threshold by delta_cbr. The terminal may acquire configuration information so as to apply a time-to-trigger to each of the RSRP measurement value and the CBR measurement value, and may determine that the path switch condition is valid when the configuration condition for the RSRP measurement value is satisfied during the time-to-trigger or the configuration condition for the CBR measurement value is satisfied during the time-to-trigger.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a user equipment (UE) in a wireless communication system, the method comprising:
   obtaining configuration information for a discovery message; and
   receiving, from a relay UE, the discovery message via a sidelink-signaling radio bearer (SL-SRB) for the discovery message based on the configuration information,
   wherein the SL-SRB for the discovery message is different from one or more SL-SRBs for a PC5 signaling and a PC5-radio resource control (PC5-RRC),
   wherein the one or more SL-SRBs include a SL-SRB0, a SL-SRB1, a SL-SRB2, and a SL-SRB3, and
   wherein the SL-SRB for the discovery message is SL-SRB4.

2. The method of claim 1,
   wherein a configuration for the SL-SRB for the discovery message includes information on a priority for the SL-SRB, and information on a logical channel group (LCG) for the SL-SRB, and
   wherein the information on priority for the SL-SRB is same as a priority for the one or more SL-SRBs, wherein the information on LCG for the SL-SRB is same as a LCG for the one or more SL-SRBs.

3. The method of claim 1,
wherein the configuration information for the discovery message is a system information block (SIB), or a dedicated radio resource control (RRC) message.

4. The method of claim 1,
wherein a packet data convergence protocol (PDCP) Data protocol data unit (PDU) for the SL-SRB corresponds to a PDCP Data PDU for a SL-SRB0,
wherein a ciphering is not applied to the SL-SRB for the discovery message, and
wherein an integrity protection is not applied to the SL-SRB for the discovery message.

5. A method performed by a relay user equipment (UE) in a wireless communication system, the method comprising:
obtaining configuration information for a discovery message; and
transmitting, to a UE, the discovery message via a sidelink-signaling radio bearer (SL-SRB) for the discovery message based on the configuration information,
wherein the SL-SRB for the discovery message is different from one or more SL-SRBs for a PC5 signaling and a PC5-radio resource control (PC5-RRC),
wherein the one or more SL-SRBs include a SL-SRB0, a SL-SRB1, a SL-SRB2, and a SL-SRB3, and
wherein the SL-SRB for the discovery message is SL-SRB4.

6. The method of claim 5,
wherein a configuration for the SL-SRB for the discovery message includes information on a priority for the SL-SRB, and, information on a logical channel group (LCG) for the SL-SRB, and
wherein the information on priority for the SL-SRB is same as a priority for the one or more SL-SRBs,
wherein the information on LCG for the SL-SRB is same as a LCG for the one or more SL-SRBs.

7. The method of claim 5,
wherein the configuration information for the discovery message is a system information block (SIB), or a dedicated radio resource control (RRC) message.

8. The method of claim 5,
wherein a packet data convergence protocol (PDCP) Data protocol data unit (PDU) for the SL-SRB corresponds to a PDCP Data PDU for a SL-SRB0,
wherein a ciphering is not applied to the SL-SRB for the discovery message, and
wherein an integrity protection is not applied to the SL-SRB for the discovery message.

9. A user equipment (UE) in a wireless communication system, the UE comprising:
at least one transceiver; and
at least one processor, wherein the at least one processor is configured to:
obtain configuration information for a discovery message, and
receive, from a relay UE, the discovery message via a sidelink-signaling radio bearer (SL-SRB) for the discovery message based on the configuration information,
wherein the SL-SRB for the discovery message is different from one or more SL-SRBs for a PC5 signaling and a PC5-radio resource control (PC5-RRC),
wherein the one or more SL-SRBs include a SL-SRB0, a SL-SRB1, a SL-SRB2, and a SL-SRB3, and
wherein the SL-SRB for the discovery message is SL-SRB4.

10. The UE of claim 9,
wherein a configuration for the SL-SRB for the discovery message includes information on a priority for the SL-SRB, and information on a logical channel group (LCG) for the SL-SRB, and
wherein the information on priority for the SL-SRB is same as a priority for the one or more SL-SRBs,
wherein the information on LCG for the SL-SRB is same as a LCG for the one or more SL-SRBs.

11. The UE of claim 9,
wherein the configuration information for the discovery message is a system information block (SIB), or a dedicated radio resource control (RRC) message.

12. The UE of claim 9,
wherein a packet data convergence protocol (PDCP) Data protocol data unit (PDU) for the SL-SRB corresponds to a PDCP Data PDU for a SL-SRB0,
wherein a ciphering is not applied to the SL-SRB for the discovery message, and
wherein an integrity protection is not applied to the SL-SRB for the discovery message.

13. A relay user equipment (UE) in a wireless communication system, the relay UE comprising:
at least one transceiver; and
at least one processor, wherein the at least one processor is configured to:
obtain configuration information for a discovery message, and
transmit, to a UE, the discovery message via a sidelink-signaling radio bearer (SL-SRB) for the discovery message based on the configuration information,
wherein the SL-SRB for the discovery message is different from one or more SL-SRBs for a PC5 signaling and a PC5-radio resource control (PC5-RRC),
wherein the one or more SL-SRBs include a SL-SRB0, a SL-SRB1, a SL-SRB2, and a SL-SRB3, and
wherein the SL-SRB for the discovery message is SL-SRB4.

14. The relay UE of claim 13,
wherein a configuration for the SL-SRB for the discovery message includes information on a priority for the SL-SRB, and information on a logical channel group (LCG) for the SL-SRB, and
wherein the information on priority for the SL-SRB is same as a priority for the one or more SL-SRBs,
wherein the information on LCG for the SL-SRB is same as a LCG for the one or more SL-SRBs.

15. The relay UE of claim 13,
wherein the configuration information for the discovery message is a system information block (SIB), or a dedicated radio resource control (RRC) message.

16. The relay UE of claim 13,
wherein a packet data convergence protocol (PDCP) Data protocol data unit (PDU) for the SL-SRB corresponds to a PDCP Data PDU for a SL-SRB0,
wherein a ciphering is not applied to the SL-SRB for the discovery message, and
wherein an integrity protection is not applied to the SL-SRB for the discovery message.

* * * * *